US006606922B2

United States Patent
Case et al.

(10) Patent No.: US 6,606,922 B2
(45) Date of Patent: Aug. 19, 2003

(54) ROTATIONAL IMBALANCE COMPENSATOR

(75) Inventors: Wayne A. Case, Home Valley, WA (US); Laurence B. Penswick, Home Valley, WA (US)

(73) Assignee: Schmitt Measurement Systems, Inc., Portland, OR (US)

( * ) Notice: Subject to any disclaimer, the term of this patent is extended or adjusted under 35 U.S.C. 154(b) by 0 days.

(21) Appl. No.: 09/846,098

(22) Filed: Apr. 30, 2001

(65) Prior Publication Data

US 2001/0035068 A1 Nov. 1, 2001

Related U.S. Application Data

(60) Provisional application No. 60/200,447, filed on Apr. 28, 2000.

(51) Int. Cl.[7] .............................................. F16F 15/18
(52) U.S. Cl. ....................................... 74/573 R; 700/279
(58) Field of Search ............................. 74/572, 573 R, 74/573 F; 700/279

(56) References Cited

U.S. PATENT DOCUMENTS

| | | | | |
|---|---|---|---|---|
| 3,611,826 A | * | 10/1971 | Fisher et al. ............... | 74/573 R |
| 3,706,238 A | * | 12/1972 | Johnson ..................... | 74/573 R |
| 3,769,854 A | * | 11/1973 | Fryzel ....................... | 74/573 R |
| 3,812,724 A | * | 5/1974 | Curtz et al. ................ | 74/573 R |
| 3,951,044 A | * | 4/1976 | Eickmann .................. | 74/573 R |
| 4,432,253 A | | 2/1984 | Kerlin ....................... | 74/573 R |
| 4,445,398 A | | 5/1984 | Kerlin ....................... | 74/573 R |
| 4,501,947 A | | 2/1985 | Kerlin ......................... | 219/68 |
| 4,644,123 A | | 2/1987 | Kerlin ......................... | 219/68 |
| 4,935,651 A | * | 6/1990 | Hong et al. ................ | 74/573 R |
| 5,154,554 A | * | 10/1992 | Ariyoshi .................... | 74/573 R |
| 5,269,197 A | * | 12/1993 | Yang ........................... | 74/572 |
| 5,549,019 A | * | 8/1996 | Cattani ....................... | 74/573 R |
| 5,635,778 A | * | 6/1997 | Fujita et al. ............... | 74/573 R |
| 5,724,862 A | * | 3/1998 | Hannah et al. ............ | 74/573 R |
| 5,757,662 A | | 5/1998 | Dyer et al. ................... | 364/508 |

* cited by examiner

Primary Examiner—Chong H. Kim
(74) Attorney, Agent, or Firm—John R. Thompson; Stoel Rives LLP

(57) ABSTRACT

The present invention provides an enhanced system and method for compensating for load imbalances of rotating members. An imbalance compensator may have a balancing ring wirelessly controlled by a ring controller. The balancing ring may have a housing containing a plurality of actuators configured to exert force against a compensation ring within the housing. The actuators may move the compensation ring with respect to the axis of rotation of the shaft in a direction substantially opposite the direction of the imbalance. The actuators may directly contact the compensation ring, or may exert the force through the use of mechanical transfer devices that provide a selected mechanical advantage. Alternatively, a chamber containing a magnetic fluid may be used to provide a counterbalancing mass. Particles within the magnetic fluid maybe concentrated opposite the imbalance direction through the use of electromagnets or permanent magnets mounted on movable carts. As another alternative, fluid maybe pumped between a plurality of chambers by one or more micropumps, with or without the use of valves to control the fluid flow.

30 Claims, 9 Drawing Sheets

ROTATIONAL IMBALANCE COMPENSATOR

RELATED U.S. APPLICATIONS

This application claims the benefit of U.S. Provisional Application Serial No. 60/200,447 filed Apr. 28, 2000 and entitled RING BALANCER APPARATUS, which is incorporated herein by reference.

BACKGROUND OF THE INVENTION

1. The Field of the Invention

The present invention relates to systems and methods for enhancing the operation of rotating machinery. More specifically, the present invention relates to an imbalance compensator and an associated method of operation, by which an eccentric load on a driven shaft can be balanced to reduce vibrations and enhance the consistency of loading on the shaft.

2. The Relevant Technology

Rotating parts are common in many different types of machines. For example, most electric motors, internal combustion engines, transmissions, and the like include one or more rotating parts. Although rotating parts are often designed to be symmetrical, machining defects, wear, deformation, and the like often cause the center of gravity of the rotating part to be located some distance away from the axis of rotation. Thus, an eccentric load, or an imbalance, is created.

Eccentricity is often measured in terms of the magnitude of the eccentric load multiplied by the distance of the load from the rotational axis. Thus, eccentricity, or imbalance, may be stated in terms of foot pounds, gram centimeters, or the like.

Imbalanced loads are problematic for a number of reasons. They create vibrations that can cause noise, expedite wear, and potentially even result in failure of the machine, particularly where the frequency of vibration happens to match the natural frequency of some part of the machine. Additionally, imbalanced loads increase the mass moment of inertia of the rotating member, thereby placing a greater load on the driving mechanism. Furthermore, imbalanced loads can induce reciprocating stresses, or "fatigue" stresses in the machine. Fatigue stresses also tend to accelerate wear and failure of machine parts.

Imbalanced loads are particularly problematic for mechanized tools and other machines in which wear of a rotating member occurs rapidly. For example, mills, lathes, drill presses, grinders, and the like rotate tools or workpieces that will experience wear during the machining process. Unfortunately, wear may not necessarily occur evenly about the circumference of the tool or workpiece. Thus, even if the machine is well made and balanced prior to use, imbalanced loads will rapidly appear.

In response to these problems, a number of balancing devices have been created. Although known devices have been helpful in reducing load imbalances in some cases, known balancing devices tend to fall short in a number of ways. For example, many known balancing devices are somewhat complex, and are therefore expensive to manufacture and maintain.

Additionally, many known balancing devices have a somewhat limited range of compensation capability. Thus, they can only be effectively used in applications in which the magnitude of the imbalance is known to be within a certain range. Some balancing devices can be adjusted prior to use, for example, by installing additional weights or removing weights. Such devices cannot dynamically cover a wide range; rather, once an out of-spec imbalance occurs, the machine must be stopped so that the necessary adjustments can be made.

Some known balancing devices provide compensation by moving a gas, for example, through the use of thermal gradients. Unfortunately, gases are not very dense; consequently, a large volume of gas must be moved to provide compensation. The temperature gradients required to keep such volumes in place are difficult to maintain because the temperature within the balancing device tends to even itself out over time through heat transfer from heated parts of the device to those that must remain unheated to maintain the temperature gradient.

A further problem with known balancing devices is that many are simply too large to fit within the space constraints of certain machines. The amount of imbalance a given device can compensate for is dependent upon the size of the device. Some machines simply have a load imbalance/available space ratio that is too high to permit the use of existing balancing devices.

Yet further, many known devices have a limited resolution. For example, some devices have only a limited number of positions in which weights can be moved to provide compensating weight. Thus, the balancing device is unable to fully compensate for any load imbalance that falls between the levels the device is designed to counteract. Hence, the device's ability to fine tune the load balancing is severely limited.

Still further, many known devices are quite heavy. The weight of the balancing device adds to the overall weight of the machine, and also adds to the rotational inertia of the entire rotating system. Consequently, the system cannot start or stop rotation as rapidly as would be possible without the balancing device.

Accordingly, a need exists for an imbalance compensator capable of compensating for comparatively large load imbalances, without requiring a great deal of space around the rotating shaft. A further need exists for an imbalance compensator that is capable of such large scale correction without sacrificing the resolution required for fine tuning. Yet further, a need exists for an imbalance compensator that adds comparatively little weight and rotational inertia to the rotating machine. Still further, a need exists for an imbalance compensator that is comparatively simple in design and manufacture, so that the imbalance compensator can be inexpensively produced and easily adapted to different rotational systems.

BRIEF SUMMARY OF THE INVENTION

The apparatus of the present invention has been developed in response to the present state of the art, and in particular, in response to the problems and needs in the art that have not yet been fully solved by currently available balancing devices. The present invention provides an imbalance compensator with enhanced compensation range and resolution, with a comparatively lightweight, compact, and simple design.

According to one configuration, the imbalance compensator comprises a balancing ring positioned around a rotating shaft, and attached to rotate with the shaft. The balancing ring may be controlled by a ring controller positioned near the balancing ring to provide control signals and power through magnetic transmission. The ring controller, in turn, may be connected to a control console that contains circuitry pertinent to the operation of the imbalance compensator and provides a user interface. The control console may also be connected to a vibration sensor mounted at a location near the shaft and oriented to measure the shaft's vibration.

The balancing ring may be embodied in several different forms. In certain embodiments, the balancing ring has a housing with a generally annular shape. An interior opening of the housing is large enough to fit around the shaft with clearance. The housing contains a receiving coil positioned near the outer diameter of the housing. The receiving coil is connected to a processor to transmit control and power signals to the processor. Additionally, a phase sensor and a vibration sensor are also connected to the processor to relay data concerning the rotational orientation and vibration of the shaft and balancing ring to the processor.

The processor processes the vibration and phase data to determine which direction the center of gravity of the balancing ring must move to compensate for the load imbalance. The center of gravity of the ring should be moved in a direction substantially opposite that of the load imbalance, with respect to the axis of rotation of the shaft.

According to one embodiment, the processor is connected to a plurality of actuators installed in the housing. Each actuator is connected to a solid compensation mass, in the form of a compensation ring, to apply a force tending to push the solid compensation mass in a certain direction with respect to the axis of rotation of the shaft. The actuators may be axisymmetrically arrayed around the compensation ring to impinge against the compensation ring from opposing directions, thereby providing the capability to relatively move the compensation ring and housing in any direction within the plane perpendicular to the shaft.

Each actuator may take a variety of forms, one of which is a linear actuator containing a piezoelectric force crystal. Electric signals from the processor induce expansion of the piezoelectric crystal. The linear actuators may each have a movable core oriented toward the compensation ring; expansion of each crystal then moves the associated movable core to push the compensation ring. The compensation ring can be moved with respect to the housing by increasing the force exerted by the linear actuators on one side of the shaft, while decreasing the force exerted by the linear actuators on the opposite side of the shaft.

Each movable core may have a distal end that directly contacts the compensation ring. In the alternative, the movable cores may each be connected to some type of mechanical transfer device that transmits the force of the movable core to the compensation ring. For example, each of the movable cores maybe pivotally connected to a lever arm that is also pivotally attached to the housing. A distal end of the lever arm may then abut against the compensation ring. The lever arm provides a mechanical advantage that can be used to alter the displacement and force of the movable core to provide the proper combination of force and displacement against the compensation ring. These embodiments move the center of gravity of a single compensation ring away from the axis of rotation in a direction opposite the load imbalance to provide compensation.

The receiving coil may receive the power and control signals in the form of a magnetic transmission from the ring controller. The ring controller may therefore have sending coil configured to provide a time-varied magnetic field, a portion of which travels through the receiving coil.

According to other embodiments, a single chamber containing a fluid is used to move the center of gravity of the balancing ring. The chamber may have a generally annular shape. The fluid may then take the form of a magnetic fluid, with low magnetic reluctance particles suspended or otherwise contained within a nonmagnetic carrier fluid. The magnetic particles may be denser than the carrier fluid. Thus, the center of gravity of the magnetic fluid may be moved by subjecting a portion of the magnetic fluid to a magnetic field, thereby attracting the heavier magnetic particles to the portion of the fluid under the influence of the magnetic field.

The magnetic field may be provided in several different ways. According to one embodiment, a plurality of electromagnets are mounted within the housing and axisymmetrically distributed about the outer periphery of the chamber. One or more of the electromagnets may be selectively activated to create one or more fields on the side of the chamber opposite the load imbalance. The magnetic field or fields attract particles to move the center of gravity of the fluid to compensate for the load imbalance. As with the embodiment containing the mechanical actuators, power and control signals maybe received through the use of a receiving coil positioned toward the outer diameter of the housing, in combination with a sending coil within the ring controller.

In the alternative, the electromagnets may be positioned within the ring controller, which remains stationary while the balancing ring rotates. The housing therefore need only contain the chamber with the magnetic fluid; the center of gravity of the magnetic fluid may be manipulated through the use of the stationary electromagnets. For example, the ring controller may include timing circuitry configured to time the activation of the electromagnets to coincide with rotation of the shaft. Thus, the magnetic fields produced by the electromagnets remain at the same orientation with respect to the shaft to consistently compensate for the load imbalance.

In such an embodiment, the processor and phase sensor may also be positioned within the ring controller. Thus, no information need be transmitted between the balancing ring and the ring controller. Consequently, the receiving and sending coils may not be necessary.

According to another embodiment, the magnetic field in the chamber maybe created through the use of a plurality of carts positioned to move in a circular path concentric with the chamber. For example, the housing may contain a gear ring surrounding the chamber, with teeth on the inside diameter of the gear ring. The carts may each have two sprockets with teeth sized to mesh with those of the gear ring. Each cart may contain a motor to drive one or both sprockets, and a coil with which the cart can receive power and control signals.

Each cart may also have a pin that fits within a track positioned just within the gear ring. Each cart may also have a permanent magnet adjacent to the outer diameter of the chamber. The carts may be powered and directed through the use of a control coil of the housing, encircling the gear ring. Each cart then creates a magnetic field within the chamber and thereby attracts magnetic particles to its current position. The carts are moved via signals sent from the processor to the cart through the control coil. The carts may be moved close to each other to provide a high degree of imbalance compensation, or they may be positioned comparatively far apart for more minor adjustment of the center of gravity of the balancing ring.

A processor, phase sensor, and receiving coil may once again be positioned within the housing, so that the balancing ring can receive control signals and power from the ring controller. The control coil may be integrated with or positioned near the receiving coil.

According to additional alternative embodiments, the housing may have a plurality of fluid-containing chambers.

The fluid need not be a magnetic fluid, but is preferably a somewhat dense liquid. The fluid maybe pumped from one chamber to the next through the use of one or more mechanical pumps, or pumps that move fluid through the use of moving solid parts. Preferably, the pump or pumps take the form of micropumps manufactured through the use of MEMS (microelectromechanical systems) manufacturing processes. The pumping action may concentrate fluid in one or more chambers substantially opposite the imbalance direction. The chambers in which fluid is concentrated are heavier than the other chambers, and therefore provide an eccentric weight to compensate for the load imbalance.

In one configuration, a number of micropumps equal to the number of chambers may be utilized. Each micropump may be connected to two adjacent chambers through the use of conduits so that fluid is pumped in circular fashion to reach the chambers in which the fluid is to be concentrated. As with other embodiments, the housing contains a receiving coil, phase sensor, and processor that can be used to energize and control the micropumps.

In the alternative, only a single micropump may be used. The micropump may be connected to two aggregate conduits, each of which branches into conduits leading to about half of the chambers. Each conduit may have a valve to selectively permit or restrict fluid flow through the conduit. Thus, fluid may be transferred between two chambers connected to different aggregate conduits by opening one valve connected to each aggregate conduit, closing the remaining valves, and activating the micropump. To transfer fluid between two chambers fed by the same aggregate conduit, fluid may simply be transferred to a chamber fed by the other aggregate conduit, and then back to the chamber to be filled.

Through the use of the systems and methods presented herein, a comparatively large counterbalancing mass may be moved to compensate for larger imbalance loads, without making the imbalance compensator unduly heavy or unwieldy. Additionally, the counterbalancing mass may generally be adjusted in comparatively small increments to provide fine tuning of the imbalance compensation. Furthermore, the imbalance compensators may be comparatively easily manufactured and installed within a compact space.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and operational characteristics of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 10, is not intended to limit the scope of the invention, as claimed, but is merely representative of presently preferred embodiments of the invention.

Figure 1:
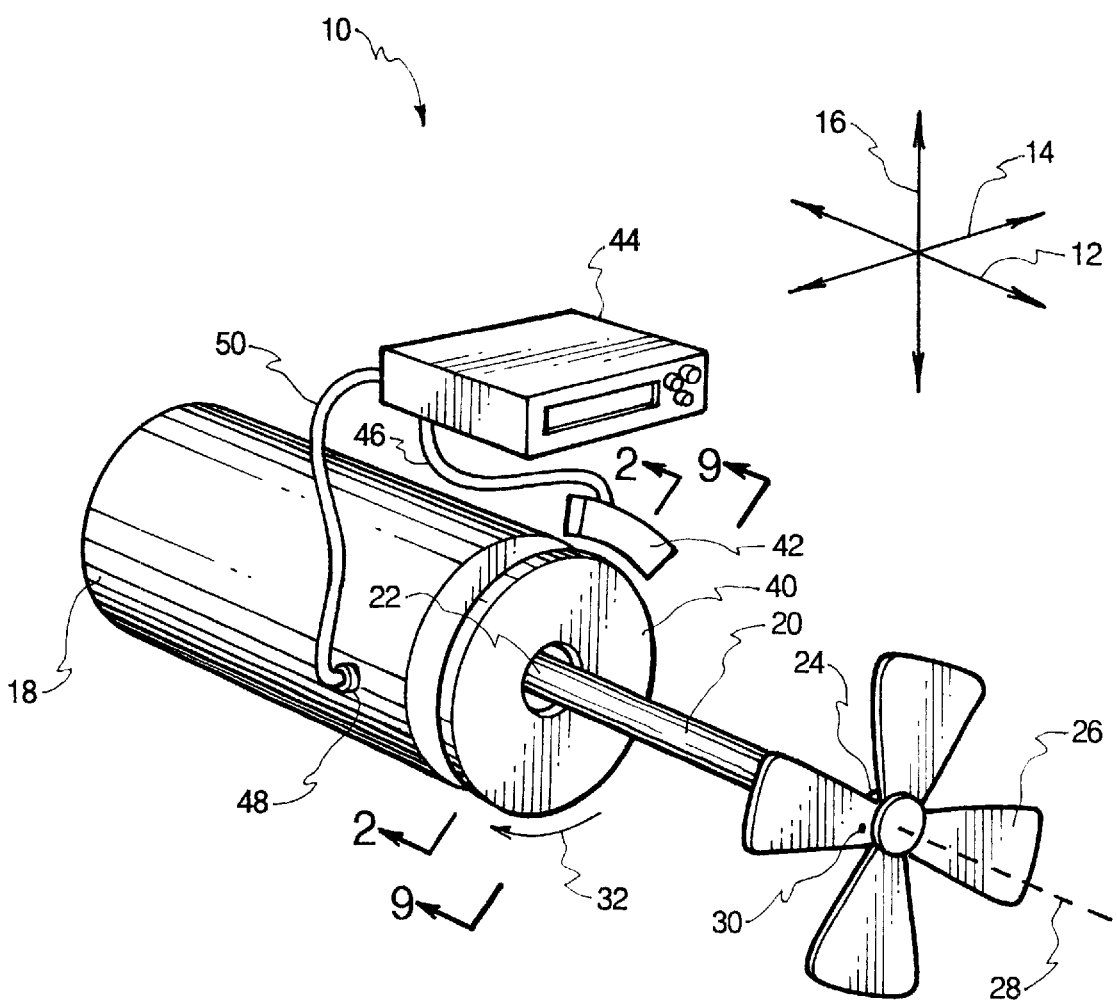
FIG. 1 is a perspective view of one embodiment of an imbalance compensator according to the present invention, affixed to a shaft that transmits torque from a motor to a load.

Referring to FIG. 1, a perspective view of one embodiment of an imbalance compensator 10 is shown. The imbalance compensator 10 may have a longitudinal direction 12, a lateral direction 14, and a transverse direction 16. A rotational driver 18, depicted as an electric motor 18, rotates a shaft 20 to which the imbalance compensator 10 is attached. Of course, the torque on the shaft 20 may originate from any type of rotational driver.

The electric motor 18 is shown directly attached to the shaft 20 for the sake of simplicity; those of skill in the art will recognize that the imbalance compensator 10 may be utilized in concert with a rotating member, regardless of the position of the rotating member within the rotational system. As used herein, a "shaft" includes any rigid member configured to transmit torque; the shaft 20 therefore need not be solid, uniformly sized, symmetrical, or circular in cross section, as depicted.

The shaft 20 may have a proximal end 22 connected, either directly or indirectly, to the motor 18 and a distal end 24 connected to some type of rotational load 26. The rotational load 26 is depicted as a fan 26, but may take any other form. The shaft 20 and fan 26 have an axis of rotation 28, about which the shaft 20 and the fan 26 rotate. A load imbalance 30 is also depicted, and is displaced somewhat from the axis of rotation 28. The load imbalance 30 represents the center of gravity of the rotating mass, which, in the case of the rotating assembly of FIG. 1, is the shaft 20 and the fan 26. The load imbalance may be the result of one or more factors such as off-center mounting of the fan 26 on the shaft 20, bending of the shaft 20, wear of the fan 26, or manufacturing defects in the shaft 20 or fan 26. The direction of rotation of the shaft 20 is depicted by the arrow 32.

The imbalance compensator 10 may include a balancing ring 40 affixed to the shaft 20, such that the balancing ring 40 rotates with the shaft 20. The balancing ring 40 provides a compensating mass to compensate for the load imbalance 30 in a manner that will be shown and described subsequently. The operation of the balancing ring 40 maybe controlled wirelessly by a ring controller 42 mounted near the balancing ring 40; the ring controller 42 need not rotate.

As shown, the balancing ring 40 is positioned proximate the motor 18. In the alternative, the balancing ring 40 may be positioned near the rotational load 26, or at any point in between the motor 18 and the rotational load 26. Use of a single balancing ring 40 is known as single-plane balancing, while use of two balancing rings 40, such as balancing rings 40 positioned proximate the motor 18 and the rotational load 26, is known as dual-plane balancing. The present invention encompasses the simultaneous use of any number of balancing rings 40, which may or may not be identical, to effect load balancing.

The ring controller 42 may be connected to a control console 44 by a controller wire 46. The control console 44 may contain circuitry pertinent to the operation of the imbalance compensator 10. Additionally, the control console 44 may have components for a user interface; for example, controls and a display may be provided so that a user can monitor and adjust the operation of the imbalance compensator 10.

The control console 44 may also be connected to a vibration sensor 48 via a sensor wire 50. The vibration sensor 48 may be mounted at any location coupled to the shaft 20 such that vibrations from the shaft 20 will be transmitted to the vibration sensor 48. Thus, the vibration sensor 48 is shown affixed to the motor 18. The vibration sensor 48 is preferably oriented to measure vibrations in a direction perpendicular to the shaft 20. The vibration sensor 48 may, for example, take the form of an accelerometer incorporating a piezoelectric crystal.

The vibration sensor 48 returns a vibration signal to the control console 44 through the sensor wire 50. If desired, the vibration signal may be conditioned through the use of conditioning circuitry contained within the control console 44 or otherwise connected to the vibration sensor 48. The use of the vibration signal will be described in greater detail in connection with FIGS. 9 and 10.

Figure 2:
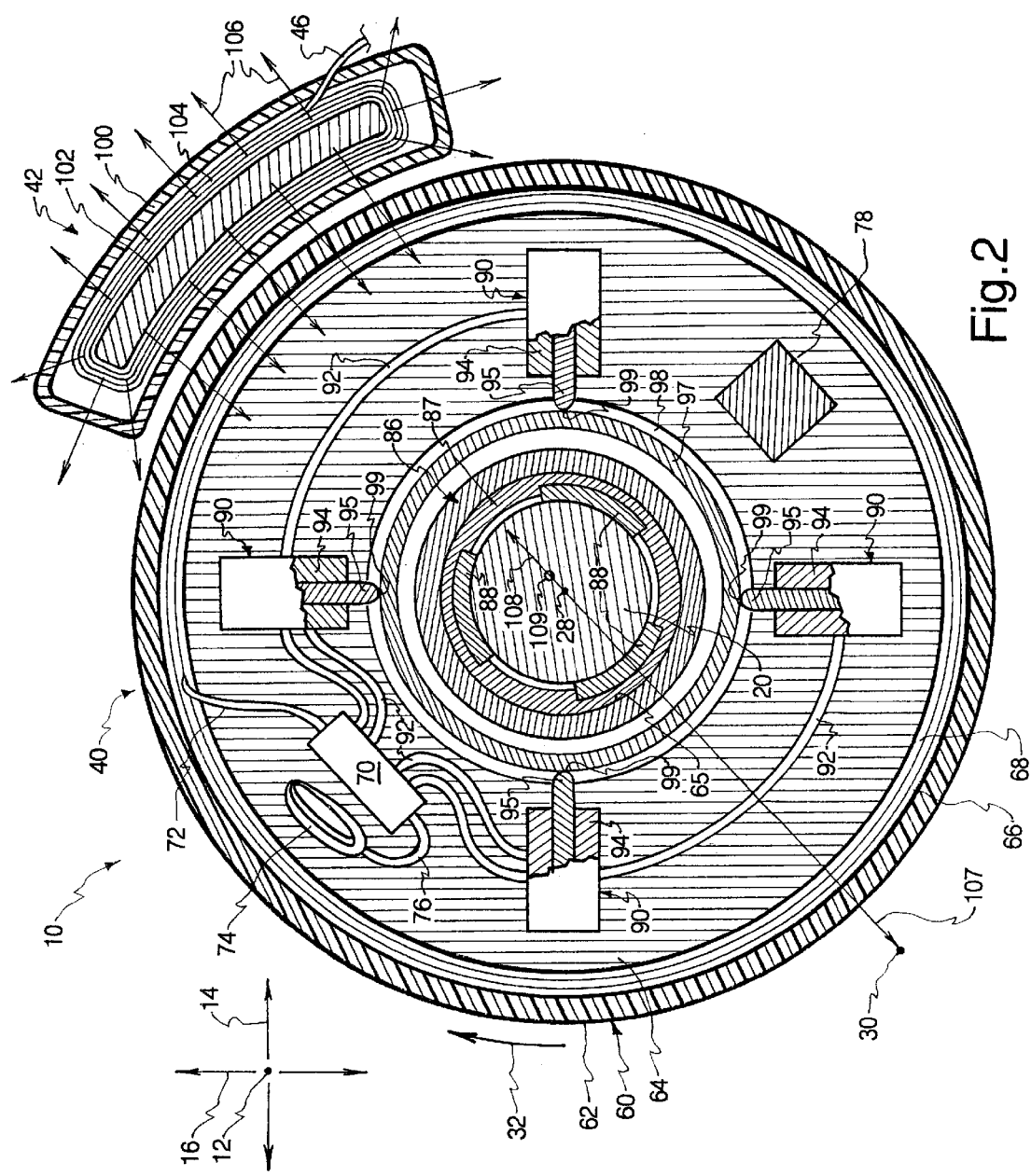
FIG. 2 is a front elevation, section view of the balancing ring, ring controller, and shaft of FIG. 1, with mechanical, linear actuators used to move a compensating ring with respect to the shaft.

Referring to FIG. 2, a section view of the balancing ring 40, ring controller 42, and shaft 20 of FIG. 1 is shown, severed along the plane designated by the number 2 in FIG. 1. The balancing ring 40 may have a housing 60 with a generally annular shape. The housing 60 may have a peripheral casing 62 at the outside diameter of the housing 60. An interior portion 64 of the housing 60 contains the internal components of the balancing ring 40. An interior opening 65 is formed in the housing, and is sized to receive the shaft 20. In the embodiment of FIG. 2, the interior opening 65 is somewhat larger than the shaft 20 so that the shaft 20 can be appropriately affixed, or fixtured, within the interior opening 65.

The interior portion 64 maybe separated from the peripheral casing 62 by an annular gap 66, in which a receiving coil 68 is disposed. The receiving coil 68 is oriented such that the receiving coil 68 encircles magnetic flux emitted by the ring controller 42. As shown, the receiving coil 68 encircles the interior portion 64 of the housing 60; nevertheless, other configurations of the receiving coil 68 may be operable.

A processor 70 is disposed within the interior portion 64, and is connected to the receiving coil 68 by a receiving coil wire 72 to receive current from the receiving coil 68. The processor 70 may include processing hardware, such as a microprocessor, ASIC, RISC chip, FPGA, or the like. Additionally, the processor 70 may include a transformer or other signal conditioning hardware configured to transform the signal received from the receiving coil 68 into a form usable by the balancing ring 40.

A phase sensor 74 may be positioned proximate the processor 70; the phase sensor 74 provides a phase signal to indicate the rotational orientation of the shaft 20 and the balancing ring 40. The phase sensor 74 may take many forms, including a hanging weight coupled to a rotary potentiometer, a cylindrical chamber with electrical contacts abutting a rolling bead of mercury, an optical sensor, or the like.

Magnetic sensors may beneficially be used to function in conjunction with the magnetically operating ring controller 42. Thus, hall effect sensors and the like may also be utilized to form the phase sensor 74.

As shown, the phase sensor 74 takes the form of a small coil 74, or reference coil, positioned near the receiving coil 68. The small coil 74 generates current when magnetic flux passes through the small coil 74, much like the receiving coil 68. However, the small coil 74 is only close enough to the ring controller 42 to receive the magnetic flux for a portion of each rotational cycle.

Thus, the phase signal from the small coil 74 cyclically increases and decreases to indicate what orientation the shaft 20 and balancing ring 40 are currently in, and to indicate the angular velocity of the shaft 20 and balancing ring 40. The processor 70 receives the phase signal via a small coil wire 76. The use and configuration of the phase signal will be described in greater detail in connection with FIGS. 9 and 10.

A counterbalance 78 may be installed in the interior portion 64 of the housing 60, opposite the processor 70 and small coil 74, to balance the difference in density between the processor 70 and small coil 74 and the surrounding material. The interior portion 64 of the housing 60 maybe beneficially constructed of a comparatively stiff and sturdy material that will retain its shape at high rotational rates. The interior portion 64 may thus be constructed of a structurally strong material such as steel, aluminum, or the like. If desired, the interior portion 64 may also be made from lighter materials such as polymers, ceramics, or the like. As a result, the processor 70 and the small coil 74 may be more or less dense than the surrounding material. The counterbalance 78 may thus be a block of comparatively heavy or light material, or even an empty space.

The shaft 20 is preferably rigidly affixed within the interior opening 65 of the housing 60. As shown, a fixturing mechanism 86 is used to affix the interior opening 65 to the shaft 20. There are a large number of ways in which a shaft can be affixed within an opening, and any such method constitutes a "fixturing mechanism," for purposes of this application.

The fixturing mechanism 86 may, for example, take the form of a collet 86 such as those used on lathes, mills, and the like, with an outer ring 87 connected to a plurality of movable segments 88 that can be actuated inward to grip the shaft 20. Due to the plane in which the section view of FIG. 2 is taken, no hatching is shown surrounding the interior opening 65; however, the interior opening 65 is formed in the housing 60 and serves to hold the collet 86 in position.

The processor 70 maybe connected to a plurality of actuators 90 by wires 92 running through the interior portion 64. The actuators 90 may be linear expansion/contraction devices, configured to provide a linear force, or rotary actuators configured to provide torque. Some exemplary types of linear expansion/contraction devices that may be used for the actuators 90 are piezoelectric actuators, solenoids, hydraulic pistons, pneumatic pistons, and thermal expansion actuators. Additionally, any other device that selectively provides a linear force maybe used. Although the above devices have different internal structures and sources of actuating force, they can all be adapted to operate based on an electric input signal.

Rotary actuators that may be used for the actuators 90 include rotary electric motors, rotary solenoids, and fluid-driven rotators. Other devices that selectively provide torque may also be used. Such rotary actuators may be adapted to operate based on an electric input signal.

Each of the actuators 90 may be a linear expansion/contraction device, or more specifically, a piezoelectric actuator. The electric input signal triggers expansion of a piezoelectric crystal (not shown). Each of the actuators 90 may have a casing 94 surrounding a movable core 95, which abuts the crystal. When electricity is applied, the crystal expands and presses the abutting movable core 95 outward with respect to the casing 94.

Each of the movable cores 95 may have a distal end 99 shaped to press against a solid compensation mass 97. In FIG. 2, the solid compensation mass 97 takes the form of a compensation ring 97 disposed within an annular cavity 98 formed in the interior portion 64 of the housing 60. When the actuators 90 are oriented as shown, each of the distal ends 99 presses inward against the compensation ring 97 so that the compensation ring 97 can be translated in the lateral direction 14, the transverse direction 16, or some combination thereof, with respect to the axis of rotation 28.

The mass of the compensation ring 97 provides compensating mass to counteract the load imbalance 30. In order to enlarge the balancing capacity of the imbalance compensator 10, the compensation ring 97 maybe made from a comparatively dense material such as lead, tungsten, iron, steel, or the like.

In other embodiments, the solid compensation mass 97 may take forms different from that depicted in FIG. 2; the actuators 90 may be adapted to suit the configuration of the solid compensation mass 97. For example, the compensation mass 97 may be a compensation ring (not shown) with an enlarged inner diameter to fit around the actuators 90; each of the actuators 90 may then be oriented outward, rather than inward, such that the solid compensation mass 97 is pressed outward by each of the actuators 90. Such a configuration provides the advantage of a more massive compensation mass 97.

As another alternative, the solid compensation mass 97 may take the form of a plurality of weights (not shown), each of which may be coupled to a respective actuator 90. The weights may each be movable along a radius from the axis of rotation 28 so that the weights can be selectively moved toward or away from the axis of rotation 28. With such a configuration, as few as two weights and two actuators may be used; the two weights may simply be configured to move perpendicular to each other so that mass of the weights as a whole, or the solid compensation mass, can be moved in any direction perpendicular to the axis of rotation 28. Those of skill in the art will recognize that the solid compensation mass 97 may take a plurality of additional forms, and that the actuators 90 may accordingly be adapted to translate the solid compensation mass 97 toward or away from the axis of rotation 28.

The ring controller 42 may have an outer casing 100 surrounding the internal components of the ring controller 42. The ring controller 42 may have an interior core 102 constructed of a material with a comparatively low magnetic resistivity, such as iron. A sending coil 104 may be wrapped around the interior core 102, within the outer casing 100. The controller wire 46 may feed directly into the sending coil 104, such that current from the control console 44 is converted into a magnetic field, represented by the flux lines 106 shown in FIG. 2. The magnetic field 106 can generally be expected to extend in all directions from the ring controller 42, but maybe somewhat more potent in the vicinity of the balancing ring 40, particularly if low magnetic reluctance materials are used to form portions of the housing 60.

More specifically, the peripheral casing 62 maybe constructed of a higher reluctance material, such as a plastic, ceramic, or nonmagnetizable metal, to avoid shielding the receiving coil 68 from the magnetic field 106. Conversely, the interior portion 64 may optionally be constructed of a comparatively low reluctance material, such as iron or steel, to encourage passage of the magnetic field 106 through the interior portion 64, and thence through the receiving coil 68. If desired, the material of the interior portion 64 may be laminated to reduce eddy current and hysteresis losses in the magnetic field 106 to enhance the power transmission and receipt characteristics of the sending and receiving coils 104, 68.

The load imbalance 30 is depicted in FIG. 2. An imbalance vector 107 extends from the axis of rotation 28 of the shaft 20 to the load imbalance 30. The direction of the imbalance vector 107 may be termed the "imbalance direction," while the length of the imbalance vector 107 indicates the distance between the load imbalance and the axis of rotation 28. The magnitude of the load imbalance 30 is its distance from the axis of rotation 28 multiplied by the mass that has its center at the load imbalance 30. Load imbalance is often stated in terms of rotational inertia, i.e., gram centimeters, foot pounds, or the like.

The balancing ring 40 compensates for the load imbalance 30 by moving its own center of gravity in a direction 108 substantially opposite the imbalance vector 107. In this application, "substantially opposite" refers to a direction pointing generally against, but not necessarily precisely opposite to, the imbalance vector 107.

In the embodiment of FIG. 2, the compensation ring 97 may be moved such that the balancing ring 40 has a new center of gravity 109 displaced from the axis of rotation 28 in the direction 108. The magnitude of the displacement of the new center of gravity 109 from the axis of rotation 28 depends on the relative rotational inertias of the balancing ring 40 and the remainder of the rotating system, for example, the shaft 20 and fan 26 of FIG. 2.

Through the use of the actuators 90, the compensating ring 97 can be repositioned with respect to the shaft 20 such that the balancing ring 40 obtains the new center of gravity 109. More specifically, the actuators 90 pointing in a direction more than 90° from the imbalance vector 107 may be energized to press more firmly against the compensation ring 97, while the actuators 90 in the opposite half of the balancing ring 40, or those that point in a direction within 90° of the imbalance vector 107, are de-energized so that they are permitted to retract.

Thus, with the configuration of FIG. 2, the bottom and left actuators 90 may be energized to press against the compensation ring 97, while the top and right actuators 90 are permitted to retract. Of course, since the direction 108 more nearly points to the right actuator 90, the right actuator 90 should be retracted more than the top actuator 90, and the left actuator 90 should similarly be actuated more than the bottom actuator 90.

As a result, the compensation ring 97 moves upward and to the right to reposition the mass of the compensating ring 97 such that the balancing ring 40 obtains the new center of gravity 109. The eccentric rotational inertia of the balancing ring 40 then compensates for that of the load imbalance 30. The geometric center of the housing 60 remains unmoved. The geometric center of the housing 60 may be defined as the center of the volume taken up by the housing 60, or the point at which the volume on either side of the point is equal, regardless of which two sides are chosen.

Although the balancing ring 40 shown in FIG. 2 has four actuators, those of skill in the art will recognize that the balancing ring 40 may be adapted to contain any odd or even number of actuators 90 greater than one. Rather than having actuators 90 positioned opposite each other, resilient mechanisms, such as springs, may be used to provide restorative force opposite each actuator.

Figure 3:
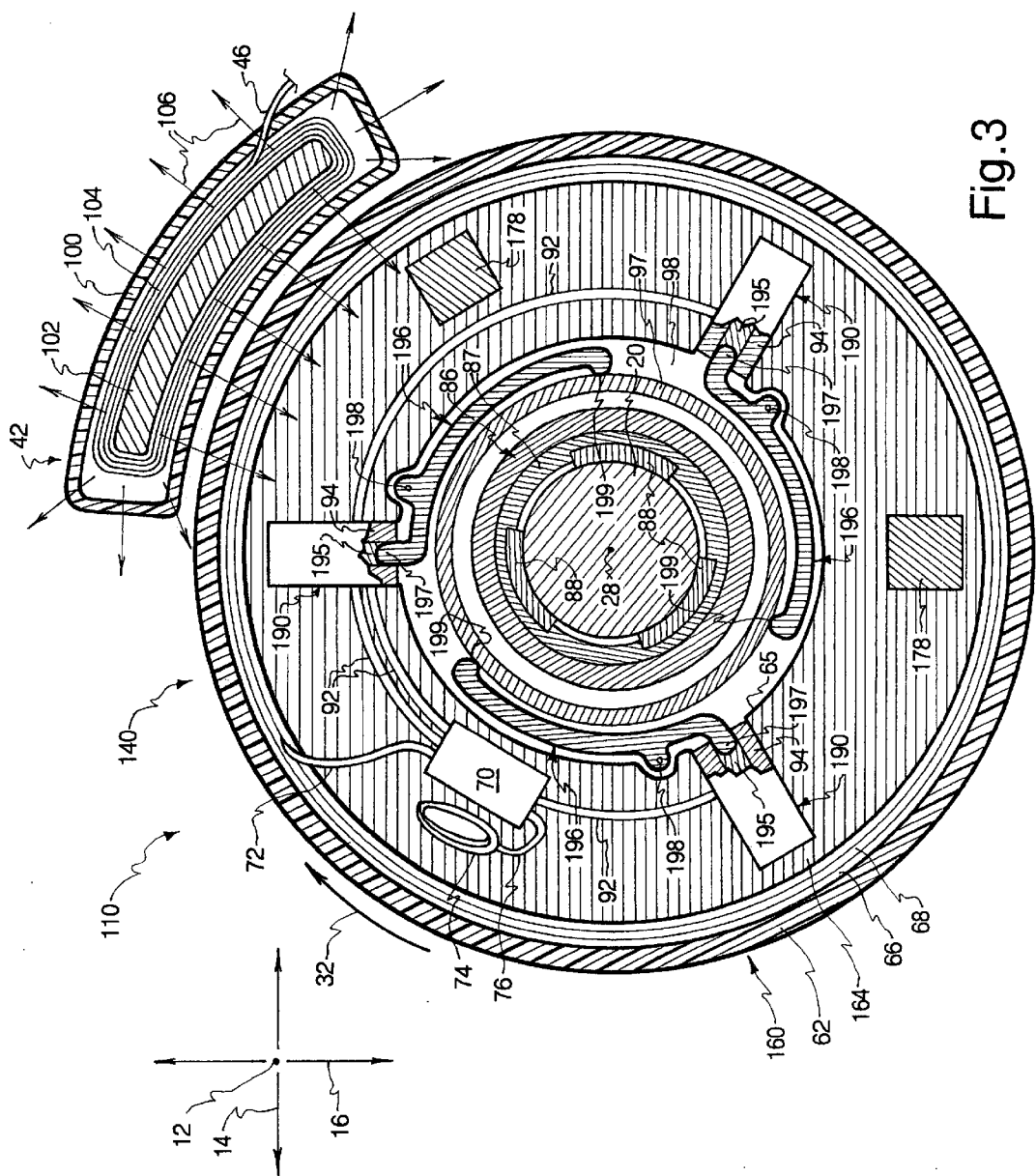
FIG. 3 is a front elevation, section view of a portion of an alternative embodiment of an imbalance compensator, with mechanical, linear actuators connected to lever arms to move the compensation ring with respect to the axis of rotation.

Referring to FIG. 3, a sectioned view of a portion of another embodiment of an imbalance compensator 110 is depicted. The installation of the balancing ring 40 on the shaft 20 may be as depicted in FIG. 1. Similarly, the imbalance compensator 110 may have a ring controller 42 like that described in connection with FIG. 2. The housing 160 also has a peripheral casing 62 with a substantially tubular shape, and an interior portion 164.

The receiving coil 68, processor 70, and small coil 74 may also be similar to those of the previous embodiment. However, the space opposite the processor 70 is obstructed in the balancing ring 140; thus, two counterbalances 178 may be provided at approximately equal angles from the processor 70, with respect to the axis of rotation 28. The housing 160 may be attached to the shaft 20 through the use of a fixturing mechanism 86 such as the collet 86 described in conjunction with FIG. 2.

The balancing ring 140 has a number of actuators 190, which may also take any form. Three of the actuators 190 are depicted, but as with the previous embodiment, any number greater than one may be utilized. Each of the actuators 190 has a movable core 195; however, the movable cores 195 do not contact the compensation ring 97. Rather, each of the movable cores 195 is connected to a mechanical transfer device configured to convey force from the movable cores 195 to the compensation ring 97.

A "mechanical transfer device" is simply any device that receives an input force or torque and provides a corresponding output force or torque. Thus, mechanical transfer devices include linkages, cams, geared transmissions, hydraulic pistons, pneumatic pistons, worm and spur gear assemblies, and rack and pinion gear assemblies. Each of the devices listed above may be configured to receive an input force and return a corresponding output force. Mechanical transfer devices may be configured to provide a desired mechanical advantage, which is generally defined as the ratio of output force or torque over input force or torque. The same ratio will be equal to the ratio of input displacement over output displacement.

Thus, a mechanical transfer device may be used to tailor the output force and displacement to a specific application. For example, piezoelectric actuators may have more than the necessary force output, with less than the required displacement. Mechanical transfer devices maybe used to effectively enhance the displacement of the actuators 190 by sacrificing some of the unneeded output force.

Each of the mechanical transfer devices may take the form of a lever arm 196, which is a type of linkage, connected to an associated movable core 195 by a pivotal attachment 197. Each of the lever arms 196 is also connected to the interior portion 164 of the housing 160 by a pivotal attachment 198, positioned proximate the annular cavity 98. A distal end 199 of each of the lever arms 196 contacts the compensation ring 97.

The distance between the pivotal attachment 198 and the distal end 199 is much greater than the distance between the pivotal attachment 197 and the pivotal attachment 198. Consequently, the effective output displacement of the actuators 190 is increased considerably, while the output force is decreased. The proportions of the lever arms 196 could be adjusted as needed to adapt to the output characteristics of the actuators 190 used. Since the lever arms 196 will be subject to considerable bending moments, they may be constructed of a stiff, high strength material such as titanium.

Otherwise, the balancing ring 140 functions in similar fashion to the balancing ring 40 of the previous embodiment. The actuators 190, in concert with the lever arms 196, move the solid compensation mass 97, in the form of the compensating ring 97, opposite the load imbalance 30 to compensate for the load imbalance 30.

Figure 4:
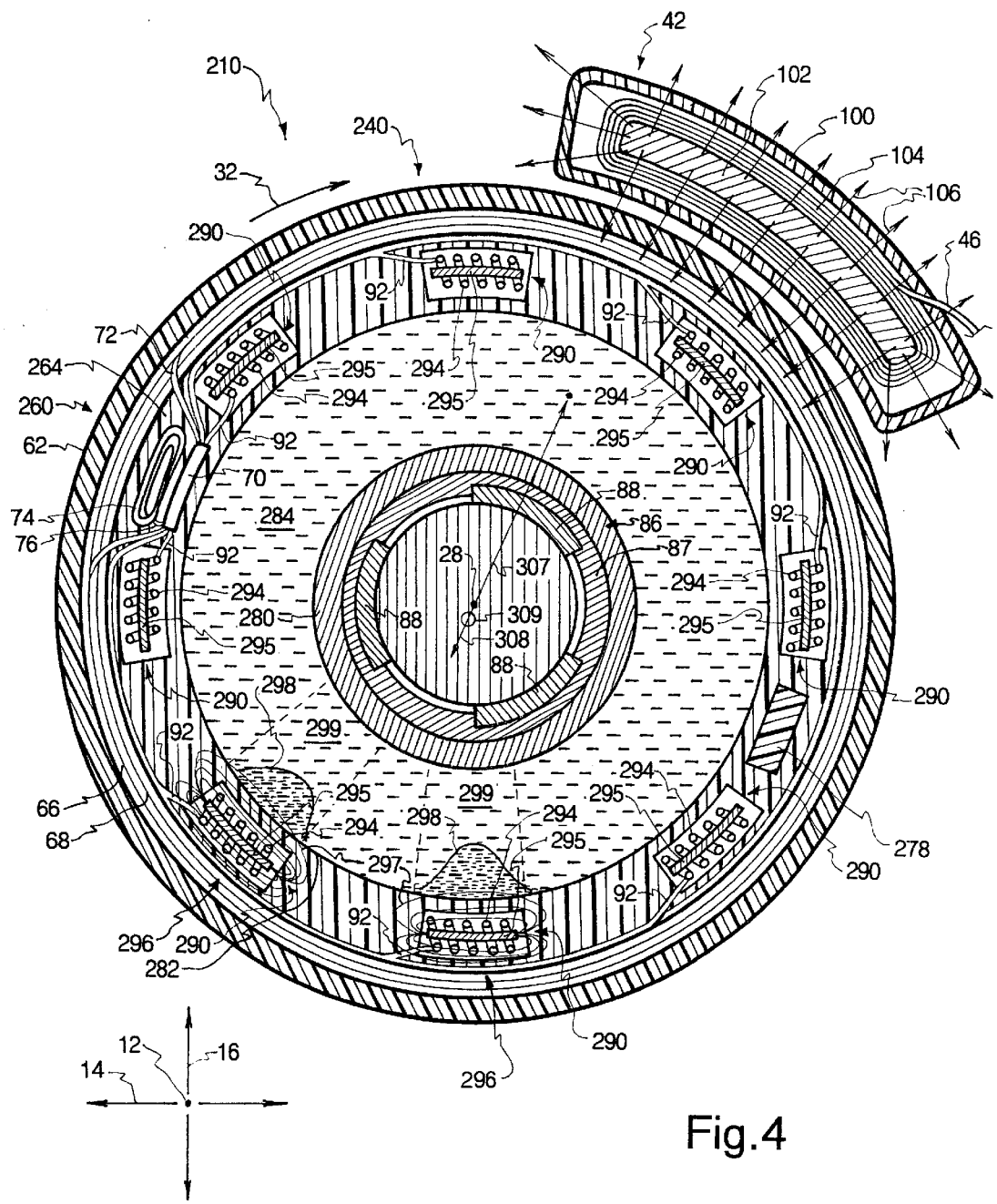
FIG. 4 is a front elevation, section view of a portion of another alternative embodiment of an imbalance compensator, with a magnetic fluid actuated by electromagnets within the balancing ring.

Referring to FIG. 4, a section view of a portion of another alternative embodiment of an imbalance compensator 210 is depicted. A balancing ring 240 is once again controlled and powered through the use of a ring controller 42. The balancing ring 240 has a housing 260 with a peripheral casing 62 and an interior portion 264. The receiving coil 68, processor 70, and small coil 74 are similar to those previously described, although the processor 70 and the small coil 74 are shown in a compact arrangement to make room for other components in the interior portion 264.

A counterbalance 278 may serve to balance the weight (or lightness) of the processor 70 and the coil 74. As with the embodiments of FIGS. 2 and 3, the center of gravity of the balancing ring 240 is moved away from the geometric center of the housing 260, and hence, the axis of rotation 28, to provide a counterbalancing mass for the load imbalance 30. Hence, the interior portion 264 of the housing 260 may be constructed of a material similar to that of the housing 60 and the housing 160. Metals may provide additional strength, rigidity, and magnetic transmission; and may thus be used. However, lighter materials, such as plastics or ceramics, may also be utilized. The density of the counterbalance 278 is preferably well adapted to balance the weight of the processor 70 and small coil 74, regardless of the material of the interior portion 264.

The housing 260 may also have an interior wall 280 so that the interior wall 280 and the interior portion 264 define a chamber 282 within the housing 260. The chamber 282 may have a generally annular shape, as shown, although the shape need not be precisely annular. The chamber 282 contains a magnetic fluid 284. The housing 260 may be attached to the shaft 20 through the use of a fixturing mechanism 86 such as the collet 86 described in conjunction with FIG. 2.

The magnetic fluid 284 preferably contains particles of a material that has a low magnetic resistivity, such as iron or an iron alloy. The particles may be suspended as colloids or maintained in a larger form within a carrier, such as an oil. According to one embodiment, the magnetic fluid includes, by volume, about 5% magnetic material, 10% surfactant that surrounds the magnetic particles, and 85% carrier fluid. The magnetic material may, for example, be Fe3O4, or a similar substance.

The magnetic fluid 284 can be actuated through the use of a concentration mechanism. A "concentration mechanism" is any apparatus configured to concentrate the mass of a fluid within one portion of the fluid. The magnetic fluid 284 maybe concentrated through the use of magnetic fields. More specifically, when a portion of the magnetic fluid 284 is exposed to a magnetic field, the magnetic particles in that portion of fluid are attracted to the field. Since the magnetic particles are denser than the carrier fluid, the mass of the magnetic fluid 284 can be magnetically moved, although the total volume of the fluid may not move. Thus, the chamber 282 can be completely filled with magnetic fluid 284, and the mass of the magnetic fluid 284 may still be moved by the concentration mechanism.

In the embodiment of FIG. 4, the magnetic fields are applied by a concentration mechanism in the form of a plurality of electromagnets 290 positioned within the interior portion 264 of the housing 260. The electromagnets 290 are each electrically connected to the processor 70 by wires 92.

Each electromagnet 290 is configured to selectively create a magnetic field within a portion of the chamber 282. The electromagnets 290 may have any known configuration. For example, each electromagnet 290 may have a coil 294 surrounding a low reluctance core 295, such as an iron rod. Application of electric current through the coil 294 thus creates a magnetic field extending through the low reluctance core 295 and around the coil 294.

As shown, the coils 294 are oriented such that the polarity of each of the electromagnets 290 is along the outer curvature of the chamber 282. However, the electromagnets 290 may be oriented in a wide variety of ways according to the invention. Furthermore, although the electromagnets 290 are shown encircling the chamber 282, they may instead be positioned in a tighter circular formation displaced from the chamber 282 in the longitudinal direction 12, such that magnetic fields overlap the chamber from one or both longitudinal sides.

As shown in FIG. 4, two of the electromagnets 290, designated 296, have been activated. The flux lines 297 represent the magnetic fields 297 produced by the active electromagnets 296. Each of the active electromagnets 296 may produce a particle concentration 298 within the fluid 284 in the chamber 282. The magnetic particles of the particle concentrations 298 may be effectively gathered from a swath of magnetic fluid 284 affected by the magnetic fields 297. Thus, each of the particle concentrations 298 may have an associated depleted portion 299 of magnetic fluid, 284, shown bounded by dashed lines, in which there is a comparatively low concentration of magnetic particles.

The particle concentrations 298 are regions in which the fluid 284 is comparatively dense due to the larger concentration of magnetic particles. Since the particle concentrations 298 are on the outer periphery of the chamber 282, they are a comparatively large distance from the axis of rotation 28. Thus, the rotational inertia of the portion of the chamber 282 containing the particle concentrations 298 is larger than the remaining portions of the chamber 282. The center of gravity of the balancing ring 240 is therefore moved toward the particle concentrations 298.

As with previous embodiments, the load imbalance 30 is disposed at an imbalance vector 307 with respect to the axis of rotation 28. A direction 308 substantially opposite the imbalance vector 307 depicts the direction in which mass must move in order to provide compensation. The mass of the balancing ring 260 is moved in the direction 308 to form a new center of gravity 309. The mass of the balancing ring 260 is moved through the formation of the particle concentrations 298 which, together, increase the mass of a somewhat wide portion of the chamber 282 positioned substantially opposite the imbalance vector 307 and the imbalance direction.

Preferably, the electromagnets 290 are not simply on or off, but can be variably energized to provide magnetic fields 297 of varying strength. If the direction 308 happens to point directly to one of the electromagnets 290, only that electromagnet 290 may be energized. If desired, electromagnets 290 to either side may also be energized in symmetrical fashion to provide additional compensating mass. If the direction 308 points directly between two of the electromagnets 290, each of them may be equally energized. Again, electromagnets 290 to either side may also be symmetrically energized to provide additional compensating mass.

However, if the direction 308 points nearer one electromagnet 290 than to another, the electromagnets 290 on either side of the direction 308 need not be equally energized. This is the scenario depicted in FIG. 4, as one of the electromagnets 290 has created a larger particle concentration 298, and hence, a larger depleted portion 299, than the other. Thus, the resolution of the imbalance compensator 210 need not be materially limited by the number of electromagnets 290 used.

Preferably, the electromagnets 290 are symmetrically arrayed around the outer diameter of the chamber 282, as depicted in FIG. 4. However, an asymmetrical positioning may also be used. For example, two electromagnets maybe positioned at perpendicular radii from the axis of rotation 28; each electromagnet may have a counterweight heavier than the electromagnet on the opposite side of the chamber 282 from the electromagnet. Each of the two electromagnets may then be controlled to adjust the weight of particles they capture to overcompensate or undercompensate for the counterweight, depending on where the new center of gravity 109 is to be located. Such an embodiment provides some simplicity, perhaps at the cost of balancing capacity. Thus, a higher number of electromagnets 290, such as the eight electromagnets 290 depicted in FIG. 4, may beneficially be used.

The imbalance compensator 210 is generally advantageous in that no moving parts are required within the balancing ring 240. Balancing is accomplished through the magnetic actuation of the fluid 284. Thus, wear and maintenance issues are virtually nonexistent. The imbalance compensator 210 may lose some balancing capacity at higher rotational rates because the centrifugal force will tend to draw the magnetic particles toward the outside of the chamber 282 in a somewhat uniform fashion. However, it is anticipated that the electromagnets 290 will be selected to be powerful enough to concentrate the magnetic particles even at higher rotational rates.

Figure 5:
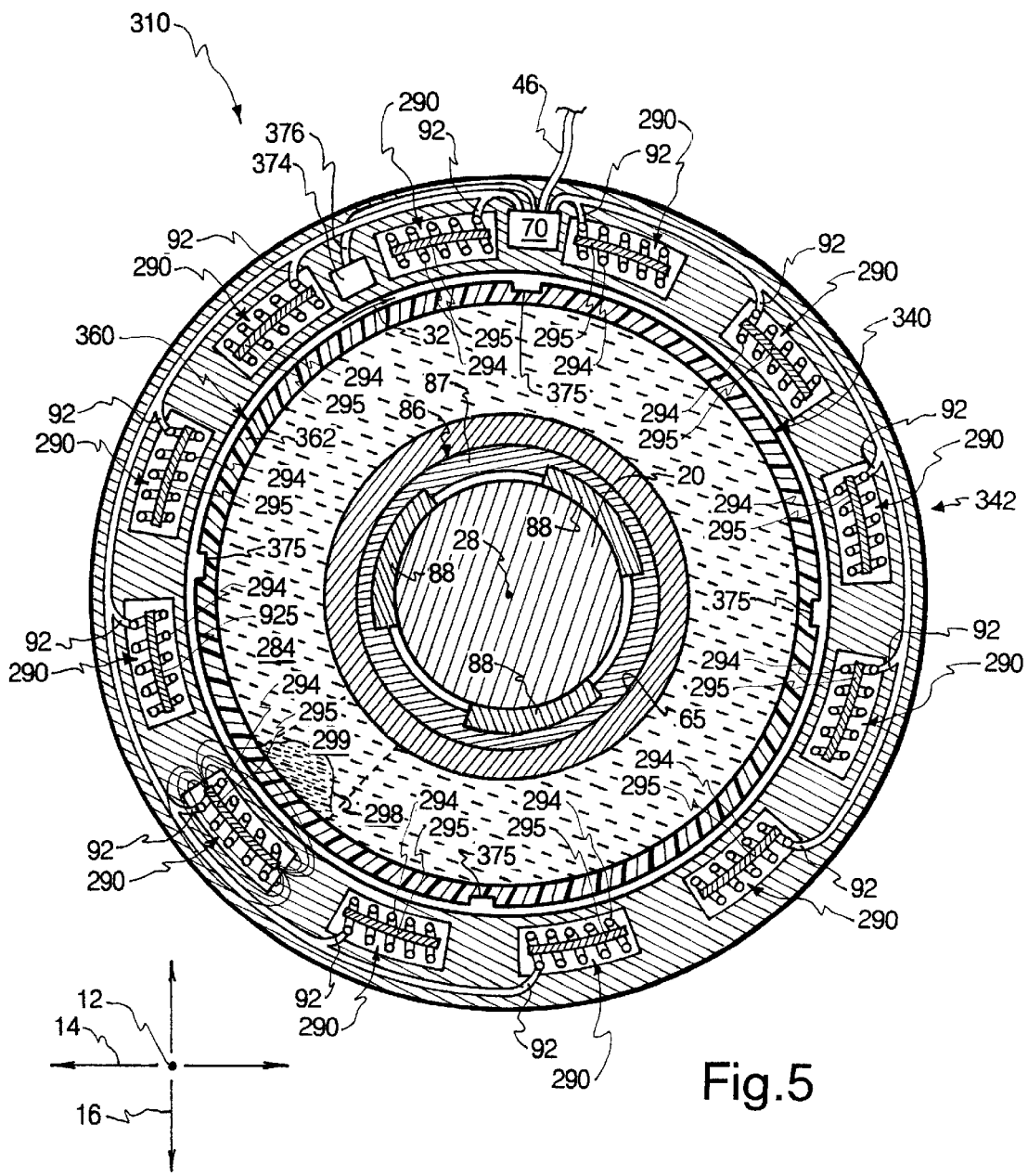
FIG. 5 is a front elevation, section view of a portion of another alternative embodiment of an imbalance compensator, with a magnetic fluid actuated by electromagnets mounted in stationary fashion within the ring controller.

Referring to FIG. 5, a portion of another embodiment of an imbalance compensator 310 is depicted. The imbalance compensator 310 has a balancing ring 340 and a ring controller 342. A housing 360 has a peripheral casing 362 and an interior wall 280 forming a chamber 282 with an annular shape. No interior portion of the housing 360 is needed because the housing 360 contains only the chamber 282. The housing 360 may be affixed to the shaft 20 through the use of a fixturing mechanism 86, such as the collet 86 depicted.

In contrast to previous embodiments, the ring controller 342 contains all of the components necessary to move the center of gravity of the balancing ring 340. Thus, the sending coil 104 and the receiving coil 68, and their associated components, are not needed. Instead, the processor 70 is directly connected to the controller wire 46.

In place of the small coil 74, the phase sensor 374 of the imbalance compensator 310 takes the form of an optical sensor 374 configured to provide a signal corresponding to received electromagnetic signals. A plurality of notches 375 may then be formed in the peripheral casing 362 of the housing 360; when each notch 375 passes by the optical sensor 374, the optical sensor 374 reacts to the alteration in electromagnetic radiation bouncing off of the peripheral casing 362, and provides a corresponding identifier in the phase signal. In the alternative to the notches 375, other visual identifiers may be used, such as painted lines or the like. The phase signal is sent to the processor 70 via an optical sensor wire 376.

As with previous embodiments, any type of phase sensor may be used, including potentiometers, mercury-based systems, magnetic systems, and the like. The optical sensor 374 maybe used in place of the small coil 74 because the optical sensor 374 does not depend on the magnetic field 106 for its operation.

The electromagnets 290 are installed in the ring controller 342; thus, they remain stationary while the balancing ring 340 rotates. However, the counterbalancing weight of the balancing ring 340 must rotate at the same angular velocity as the shaft 20. Thus, the electromagnets 290 are preferably timed to activate in rotational sequence to correspond with the rotation of the shaft 20. The processor 70 may have some type of timing circuitry to time operation of the electromagnets.

As shown in FIG. 5, an active electromagnet 296 creates a magnetic field 297 that overlaps the chamber 282. The magnetic field 297 creates a particle concentration 298 in the chamber 282 in the vicinity of the active electromagnet 296. The particle concentration 298 should remain in substantially the same position with respect to the chamber 282 so that the load imbalance 30 is consistently compensated for. Timing the electromagnets 290 in rotational sequence serves to maintain the particle concentration 298 as it rotates. As with the previous embodiment, a depleted portion 299 of the fluid may exist proximate the particle concentration 298.

The embodiment of FIG. 5 is advantageous in that the balancing ring 340 is very simple in arrangement, and no control signal need be transmitted between the balancing ring 340 and the ring controller 342. Thus, the sending coil 104 and receiving coil 68 are not needed. Additionally, a minimum of mass and rotational inertia is added to the rotating system because the balancing ring 340 contains only the chamber 282 with its magnetic fluid 284. The load added to the motor 18 by the imbalance compensator 310 is therefore minimized.

Figure 6:
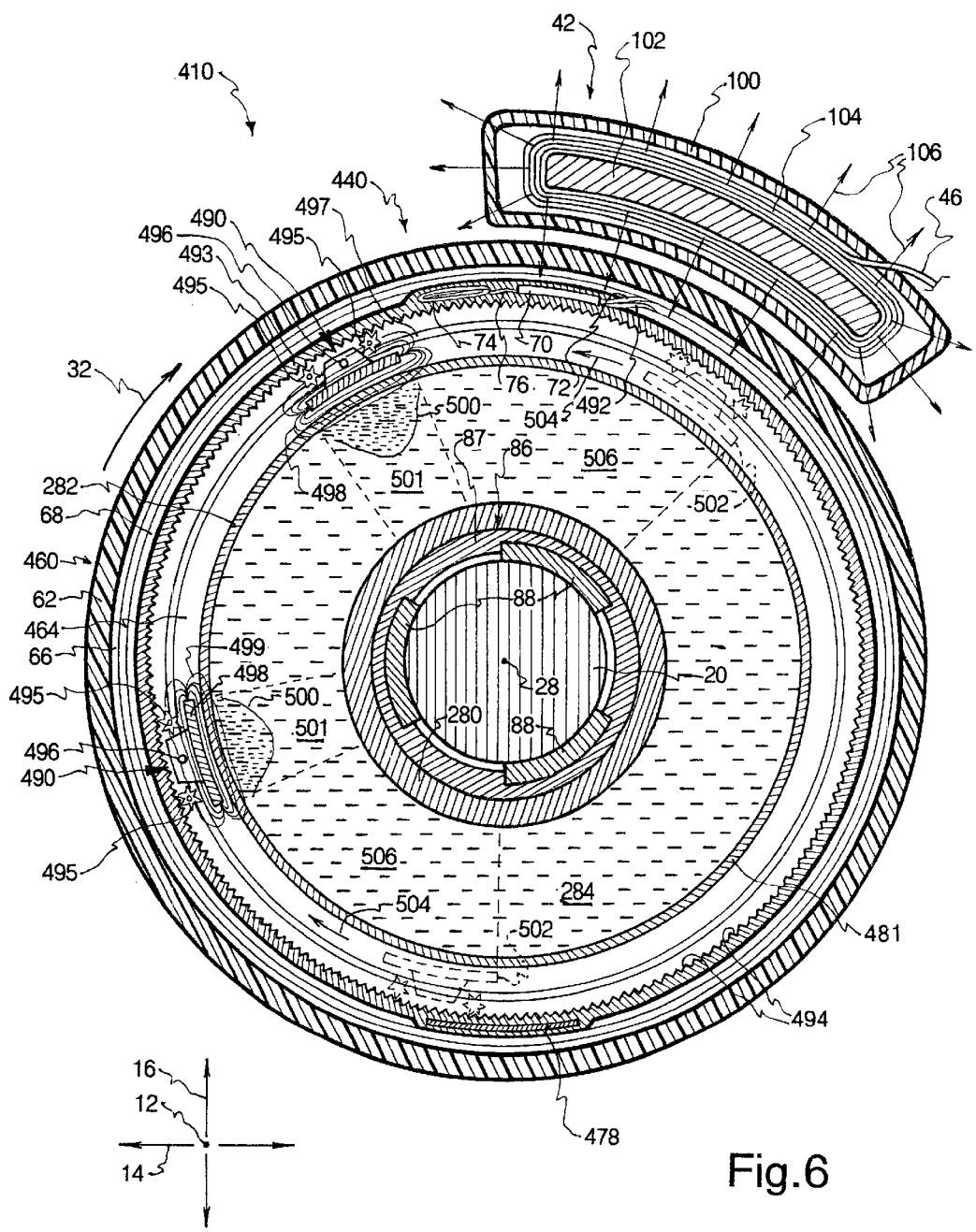
FIG. 6 is a front elevation, section view of a portion of another alternative embodiment of an imbalance compensator, with a magnetic fluid actuated by permanent magnets mounted on movable carts positioned to follow a circular path around the fluid chamber.

Referring to FIG. 6, a portion of another embodiment of an imbalance compensator 410 is shown. The imbalance compensator 410 may have a balancing ring 440 and a ring controller 42. The ring controller 42 may be configured substantially as shown and described in connection with FIGS. 2 through 4. Thus, a sending coil 104 and a receiving coil 68 may once again be provided to permit wireless power and control signal transmission from the ring controller 42 to the balancing ring 440.

The balancing ring 440 may have a housing 460 that includes a peripheral casing 62 and an interior wall 280 as previously described. Similarly, a chamber 282 containing magnetic fluid 284 may be positioned in the housing 460. In FIG. 6, the processor 70 and the small coil 74 are shown compactly positioned side-by side proximate the receiving coil 68. A counterbalance 478 is affixed opposite the processor 70 and the small coil 74, also positioned proximate the receiving coil 68. An intermediate wall 481 of the housing 460 forms an outer boundary of the chamber 282.

In place of the electromagnets 290 of FIG. 4, an interior portion 464 of the housing 460 may have a concentration mechanism in the form of a plurality of carts 490 positioned to travel in a circular path around the chamber 282. The carts 490 may alternatively be displaced from the chamber 282 in the longitudinal direction 12 and made to move in a tighter circular path alongside the chamber.

The processor 70 may be connected to a cart activation wire 492 that carries a signal to convey power and instructions to the carts 490. The cart activation wire 492 may be connected to the receiving coil 68, or to a similar coil positioned in the same approximate location as the receiving coil 68. The coil connected to the cart activation wire 492 creates a magnetic field that can be received by internal coils of each cart 490 so that the carts 490 receive power and instructions from the processor 70.

A gear ring 493 may separate the carts 490 from the receiving coil 68. The gear ring 493 preferably has teeth 494 in its inside diameter. The carts 490, in turn, may each have two sprockets 495 outwardly positioned to mesh with the gear ring 493. One or both of the sprockets 495 on each of the carts 490 may be connected to an electric motor (not shown), either attached concentric with the sprocket 495, or connected to the sprocket 495 by a suitable power transmission device. Torque from the electric motors is transmitted to the sprockets 495, so that the sprockets 495 drive the carts 490 against the teeth 494 of the gear ring 493.

Each of the carts 490 may also have a pin 496 protruding from the cart 490 in the longitudinal direction 12. The pins 496, which may have smooth, bearing surfaces, fit within an annular track 497 displaced from the carts 490 in the longitudinal direction 12. If desired, each of the carts 490 may have two such pins 496, each of which protrudes from one side of the cart 490. Two annular tracks 497 may be formed in the interior portion 464 of the housing 460, on either side of the carts 490, to receive the pins. Due to the cross sectional nature of FIG. 6, only one annular track 497 is depicted, and only one pin 496 for each of the carts 490.

Each of the carts 490 may have a permanent magnet 498 attached to the cart 490 and positioned proximate the chamber 282. The permanent magnets 498 each have a magnetic field, represented by flux lines 499, that overlaps a portion of the chamber 282. Preferably, the permanent magnets 498 are of a type that produces a comparatively high flux density, such as a neodymium-boron (NdBFe) type magnet. The polarity of each of the permanent magnets 498 may be along the length of the associated cart 490. Each of the permanent magnets 498 may be arcuate, so that the permanent magnets 498 tightly follow the outer curvature of the chamber 282.

As shown, each of the magnetic fields 499 produces a particle concentration 500 within the magnetic fluid 284 in the chamber 282. A depleted portion 501 of the magnetic fluid 284 may exist near each of the particle concentrations 500, as with the embodiments of FIGS. 4 and 5. The particle concentrations 500 maybe substantially the same size, since the magnetic fields 499 emanating from the permanent magnets 498 are substantially the same strength. Thus, the carts 490 may be symmetrically positioned opposite the load imbalance 30, so that the angle between the carts 490, with its vertex at the axis of rotation 28, would be bisected by the imbalance vector 307 and the direction 308.

In selected configurations, the carts 490 may be used to sweep magnetic particles from a segment of the magnetic fluid 284. For example, the carts 490 may initially (prior to load balancing) be in starting positions 502, shown in phantom. As the carts 490 move in directions indicated by arrows 504 to their final positions to compensate for the load imbalance, they may tow a number of magnetic particles with them so that the particle concentrations 500 are somewhat larger than they would have been without motion of the carts 490. Thus, motion of the carts 490 may leave semi-depleted portions 506 of magnetic fluid 284 within the chamber 282, from which some magnetic particles have been drawn into the particle concentrations 500.

The sweeping effect may be controlled by adjusting the speed and direction of the carts 490. For example, sweeping may be altered by moving the carts 490 back and forth along a path to attract a larger number of magnetic particles, by moving the carts 490 more rapidly to release captured particles, or the like.

As an alternative, the carts 490 may carry electromagnets in place of the permanent magnets 498. Electromagnets require additional power, but may provide advantages in that they can produce a magnetic field with an adjustable strength. With the permanent magnets 498, the configuration of FIG. 6 is advantageous in that no steady supply of power need be utilized to maintain the particle concentrations 500; the particle concentrations 500 are kept in place by permanent magnetic fields 499.

Figure 7:
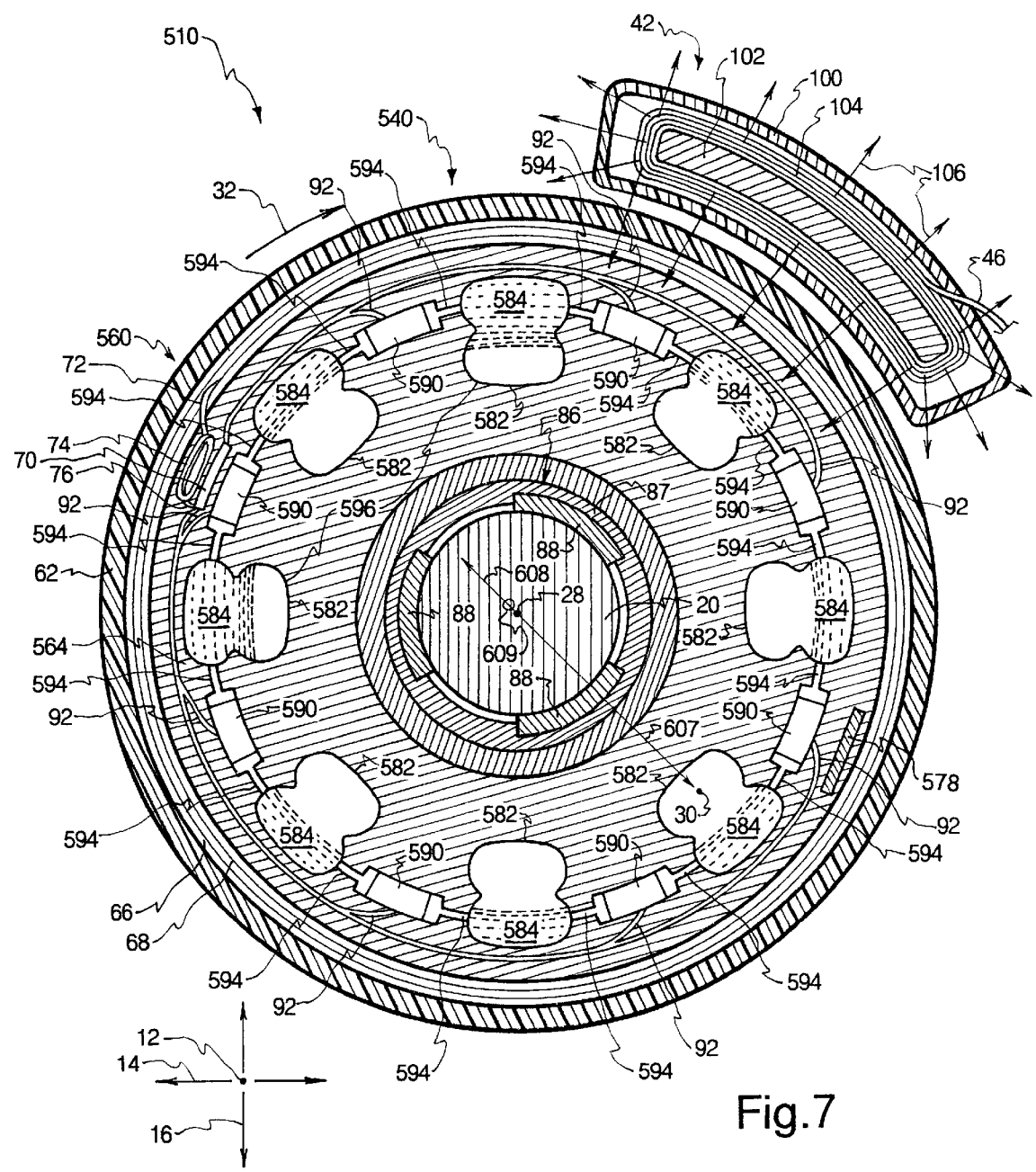
FIG. 7 is a front elevation, section view of a portion of yet another alternative embodiment of an imbalance compensator, with a plurality of fluid-containing chambers connected by micropumps connected to each adjacent set of chambers to transfer the fluid in a circuit through the chambers.

Referring to FIG. 7, a portion of yet another embodiment of an imbalance compensator 510 is shown. The imbalance compensator 510 may have a ring controller 42 configured in substantially the same way as those depicted in FIGS. 2 through 4 and FIG. 6. A balancing ring 540 of the imbalance compensator 510 may have a housing 560 containing the receiving coil 68, which receives power and control signals from the ring controller 42. The balancing ring 540 may be affixed to the shaft 20 through the use of a fixturing device 86, which may be configured as a collet 86, as described previously.

The housing 560 has an interior portion 564; as with the previously described embodiments, the balancing ring 540 does not derive balancing mass from the mass of the interior portion 564. Thus, the interior portion 564 may be made of a lightweight material to reduce the weight and rotational inertia added by the balancing ring 540; however, heavier materials may be used for structural strength or magnetic compatibility. The processor 70 and small coil 74 maybe positioned in the interior portion 564, and maybe balanced through the use of a counterbalance 578.

The interior portion 564 may contain a plurality of chambers 582, each of which is configured to contain a fluid 584. The chambers 582 may have any shape. Although eight chambers 582 are shown, those of skill in the art will recognize that any number of chambers 582 greater than one may be used. For example, two chambers 582 may operatively be used in much the same way as two electromagnets 290 may be used in the embodiment of FIG. 4; such an arrangement may provide simplicity at the cost of balancing capacity.

The fluid 584 need not be magnetic, but is preferably a somewhat dense liquid, so that repositioning of the fluid 584 has a substantial impact on the center of gravity of the balancing ring 540. The chambers 582 may be connected by a mechanical pumping assembly in the form of pumps 590. Preferably, the pumps 590 are equal in number to the number of chambers 582, so that each pair of adjacent chambers 582 is connected by a pump 590. Wires 92 connect each pump 590 to the processor 70.

The pumps 590 may take the form of micropumps produced through the use of MEMS (microelectromechanical systems) manufacturing techniques. Micropumps are generally very small, and can be operated with a comparatively low amount of electricity. The micropumps 590 may use flexible membranes, thermally expanding members, or the like, to mechanically pump fluid. For purposes of this application, "mechanical pumping" and "mechanical pumping assembly" refer to any method or apparatus in which the fluid is moved through contact with a moving solid member. Consequently, fluid movement methods involving no moving parts, such as induction and resistance heating to induce fluid expansion, are not mechanical pumping.

Each of the micropumps 590 may be positioned between two adjacent chambers 582, and connected to those chambers 582 through the use of fluid conduits 594. The micropumps 590 may then be activated to concentrate the fluid 584 into one or more of the chambers 582 to create heavier chambers 596, shown with a larger amount of fluid 584. The micropumps 590 are preferably bi-directional, i.e., able to pump the fluid 584 in either direction. The micropumps 590 may also be configured to provide a variable fluid flow rate, or to simply operate in on/off fashion.

As with previous embodiments, the load imbalance 30 is displaced from the axis of rotation 28 by an imbalance vector 607. A direction 608 is substantially opposite the imbalance vector 607. The balancing ring 540 is to be moved to obtain the new center of gravity 609.

As shown in FIG. 7, there are two heavier chambers 596 on either side of the direction 608; the remaining chambers 582 have a substantially equal amount of fluid 584. However, the fluid 584 may be distributed between the chambers 582 in a wide variety of ways. For ex ample, a single chamber to which the direction 608 points may be filled, and a chamber 582 on the opposite side of the housing 560 may be depleted, while the remaining chambers 582 remain at an intermediate state. Alternatively, fluid 584 maybe added equally to all of the chambers 582 generally in the half of the balancing ring 540 in the direction 608, and removed equally from all of the chambers 582 in the opposite half of the balancing ring 540. In any case, the heavier chambers are, collectively, positioned substantially opposite the imbalance vector 607 and the associated imbalance direction.

Preferably, the chambers 582 on one side of the imbalance vector 607 and the direction 608 collectively always contain the same amount of fluid 584 as the chambers 582 on the opposite side of the imbalance vector 607 and the direction 608. Thus, while mass of the fluid 584 is moved generally from the imbalance vector in the direction 608, the mass of the fluid 584 does not move perpendicular to the imbalance vector 607 and the direction 608 to cause any further imbalances.

Additionally, each of the chambers 582 may beneficially have a minimum fluid level. The fluid 584 can be expected to accumulate at the outer edges of the chambers 582 due to centrifugal force. The fluid conduits 594 are therefore connected proximate the outer edges so that the micropumps 590 draw liquid, rather than vapor. Some mechanical pumps can be damaged by artifacts such as cavitation when they take in gaseous material. Hence, the processor 70 maybe configured to leave the micropumps 590 idle until the balancing ring 540 and shaft 20 have reached a speed sufficient to fill all of the fluid conduits 594 with fluid. The processor 70 may also be configured to maintain the minimum fluid level in each of the chambers 582.

The embodiment of FIG. 7 has the advantage of providing a counterbalancing mass, in the form of the fluid 584, that can be freely moved to a plurality of chambers 582. A comparatively large amount of fluid 584 may be moved; hence, the counterbalancing capacity of the imbalance compensator 510 may be comparatively large. Simultaneously, the micropumps 590 enable smaller quantities of the fluid 584 to be moved for finer adjustment. The micropumps 590 are comparatively inexpensive and lightweight.

Figure 8:
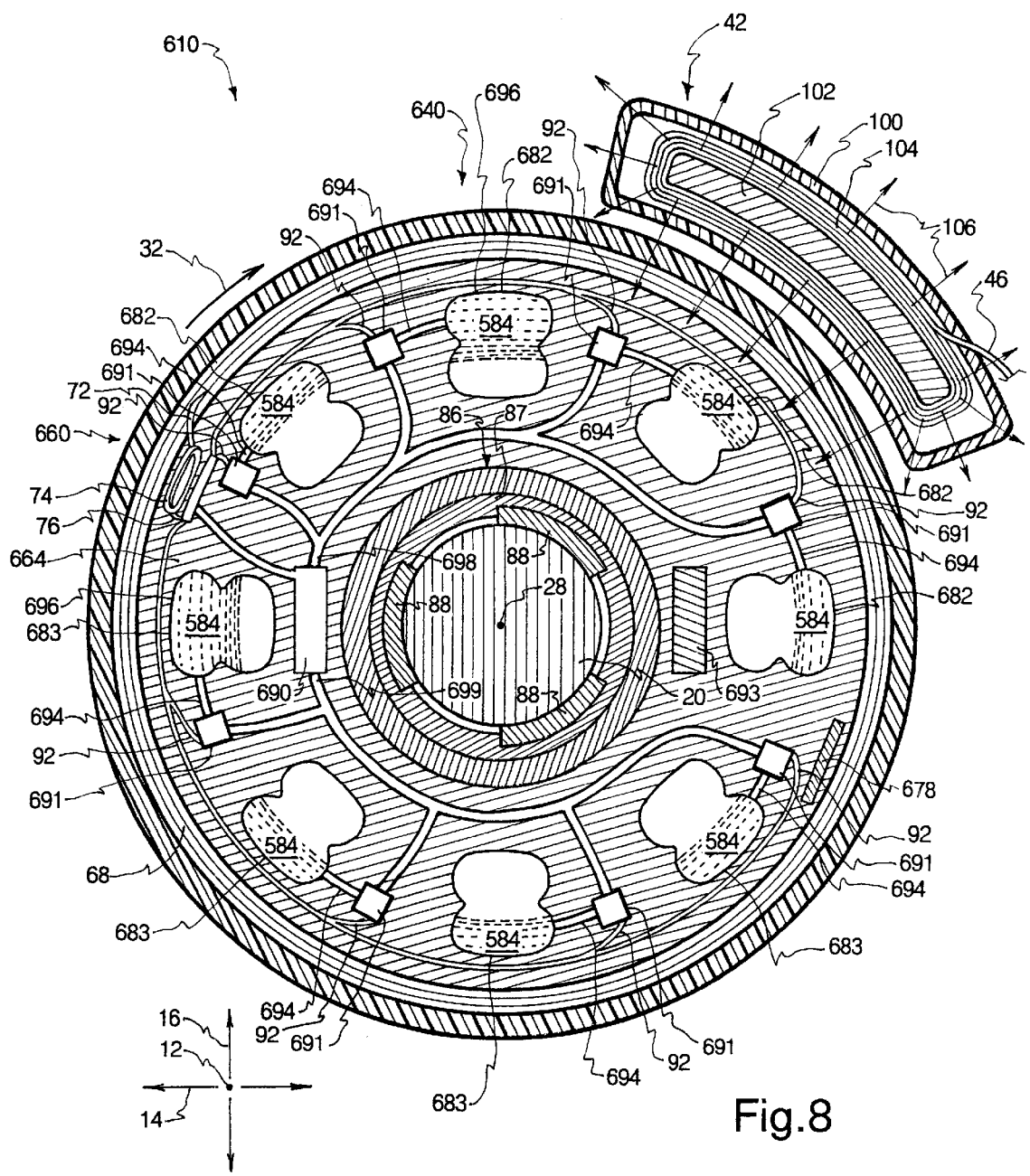
FIG. 8 is a front elevation, section view of a portion of still another alternative embodiment of an imbalance compensator, with a plurality of fluid-containing chambers connected to a single micropump through the use of conduits, each of which has a valve to control fluid communication between the associated chamber and the micropump.

Referring to FIG. 8, a portion of still another embodiment of an imbalance compensator 610 is shown. The imbalance compensator 610 may have a ring controller 42 similar to those shown in FIGS. 2–4, 6, and 7. A balancing ring 640 of the imbalance compensator 610 has a receiving coil 68 that receives power and control signals from the ring controller 42. A housing 660 of the balancing ring 640 may have an interior portion 664. A processor 70 and small coil 74 within the housing 660 are balanced by a counterbalance 678.

The interior portion 664 may contain chambers 682, 683 that can generally be divided into two groups: a first set of chambers 682 and a second set of chambers 683. A mechanical pumping assembly in the form of a single pump 690 may be installed in the interior portion 664 of the housing 660; the micropump 690 may be located at a central position with respect to the chambers 682, 683. The pump 690 may take the form of a micropump made with MEMS technology, like the micropumps 590 of the previous embodiment. In the alternative, the pump 690 may be somewhat larger, and manufactured according to more conventional methods. The following discussion assumes that the pump 690 is a micropump 690.

A plurality of valves 691 may be provided to operate in conjunction with the micropump 690. If desired, the valves 691 may also be manufactured through the use of MEMS technology; however, MEMS technology is not necessary since compact valves made through conventional processes are available. The interior portion 664 may also contain a counterbalance 693 positioned to balance the weight of the micropump 690.

The valves 691 may be equal in number to the total number of chambers 682, 683. Each of the chambers 682, 683 maybe connected to a valve 691 via a fluid conduit 694. As with the previous embodiment, imbalance compensation may be provided by concentrating the fluid 584 into one or more heavier chambers 696.

The fluid conduits 694 from the first set of chambers 682 may join into a single first aggregate conduit 698 connected to the micropump 690. Similarly, the fluid conduits 694 from the second set of chambers 683 may join into a single second aggregate conduit 699, which is also connected to the micropump 690. The micropump 690 may thus operate to transfer fluid between the first and second aggregate conduits 698, 699, and hence, from the first set of chambers 682 to the second set of chambers 683, or vice versa. Through the use of the valves 691, the source and destination chambers 682, 683 may be selected.

More specifically, the processor 70 may be configured to close all of the valves connected to the first set of chambers 682 except for one. Similarly, all of the valves connected to the second set of chambers 683 may be closed except for one. When the processor 70 activates the micropump 690, fluid 584 is transferred only between the chambers connected to open valves 691.

Consequently fluid 584 may be directly moved between any single chamber of the first set of chambers 682 and any single chamber of the second set of chambers 683. Fluid 584 may also be transferred between multiple chambers 682, 683 by leaving multiple valves 691 open. However, due to the varying length of the fluid conduits 694, unequal amounts of the fluid 584 may be transferred between the chambers 682, 683.

Fluid 584 may also be transferred between chambers 682, 683 within the same set of chambers 682 or 683. For example, to transfer fluid 584 between two chambers 682 of the first set of chambers 682, fluid 584 may first be transferred form the source chamber 682 to an arbitrarily chosen chamber 683 in the second set of chambers 683. Then, the fluid 584 may be transferred from the arbitrarily chosen chamber 683 to the target chamber 682 of the first set of chambers 682.

Otherwise, operation of the imbalance compensator 610 is somewhat similar to that of the imbalance compensator 510 of FIG. 7. The configuration of FIG. 8 is advantageous in that the fluid 584 may be transferred rapidly between any two chambers 682, 683 with a small number of steps, without moving the fluid 584 through more than one intervening chamber 682, 683. Additionally, the valves 691 maybe comparatively light and easy to manufacture; the use of a single micropump 690 may result in cost savings and/or permit the use of a pump 690 with a higher volumetric flow rate.

Figure 9:
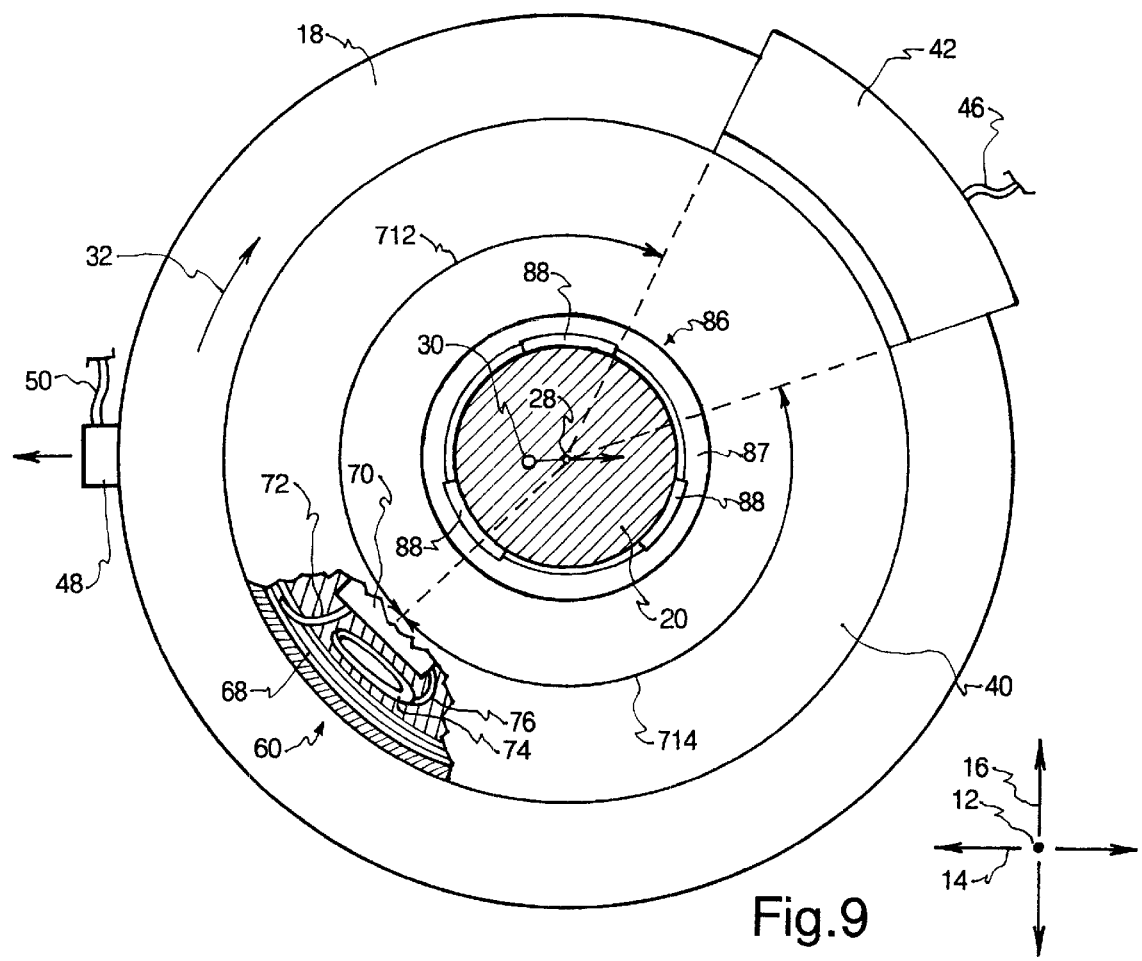
FIG. 9 is a front elevation, section view through the shaft, also depicting the motor and imbalance compensator of FIGS. 1 and 2, with a portion of the balancing ring cut away to show the phase sensor.

Referring to FIG. 9, a section view of the shaft 20 with the imbalance compensator 10 of FIG. 2 and the motor 18 is shown. The vibration sensor 48 has been attached to the left side of the motor 18. A portion of the housing 60 of the balancing ring 40 has been cut away to reveal the processor 70, the receiving coil 68, and the small coil 74. The small coil 74 has a leading angle 712 and a trailing angle 714 with respect to the ring controller 42.

The leading angle 712 represents the angle through which the shaft 20 and the balancing ring 40 must rotate to bring the small coil 74 within the magnetic field 106 emitted by the ring controller 42. Similarly, the trailing angle 714 represents the angle through which the shaft 20 and the balancing ring 40 have rotated after leaving the magnetic field 106.

Figure 10:
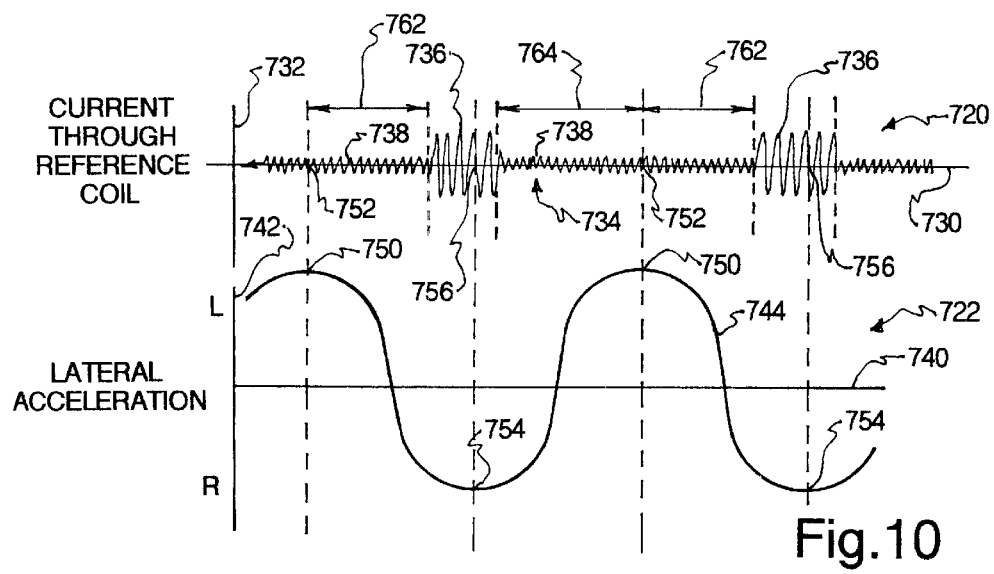
FIG. 10 is graphical representation of the phase and vibration signals, depicting how the signals may be correlated with each other to show how the phase sensor may be utilized to determine the location of the load imbalance.

Referring to FIG. 10, one possible snapshot of readings from the vibration sensor 48 and the phase sensor 74, or the small coil 74, is shown. More specifically, a phase sensor chart 720 depicts one possible phase signal from the small coil 74, and a vibration chart 722 depicts one possible vibration signal from the vibration sensor 48.

The phase sensor chart 720 has a horizontal axis 730 representing time and a vertical axis 732 representing the current through the small coil 74. The phase signal 734 is thus the current through the small coil 74 over time. If the phase sensor 74 were embodied as a different type of sensor, the vertical axis 732 would represent the type of output provided by that sensor.

As shown, the phase signal 734 has a cyclically occurring receiving zone 736, during which the small coil 74 is within the magnetic field 106. The amplitude of the current generated in the small coil 74 is comparatively large when the small coil 74 is in the vicinity of the ring controller 42. Consequently, in the receiving zone 736, the phase signal 734 has a comparatively large amplitude. A cyclical non-receiving zone 738 represents the portion of the rotation of the balancing ring 40 in which the small coil 74 is not close enough to the ring controller 42 to be influenced significantly by the magnetic field 106. Thus, the amplitude of the phase signal 734 is comparatively small in the non-receiving zone 738.

The phase signal 734, alone, can be used to determine the angular velocity of the shaft 20. For example, a count of the number of receiving zones 736 occurring within a minute provides the revolutions per minute, or RPM's, of the shaft 20. Additionally, the phase signal 734 can be used to determine the current rotational orientation of the shaft 20. The elapsed time since the end of the last receiving zone 736, divided by the time required for a single revolution (the inverse of the angular velocity), divided by 360°, is the angle of the small coil 74 with respect to the edge of the ring controller 42, or the trailing angle 714 depicted in FIG. 9. The phase signal 734 can also be used in combination with the vibration sensor 48 to determine the imbalance vector 107, as will be further described below.

The angular velocity is also the frequency of rotation, which will be the frequency of vibrations produced by the shaft 20 with its associated rotational load 26. The control console 44 may thus utilize the frequency of rotation, as provided by the phase sensor 74, to filter out all frequencies from the vibration sensor 48 except for the frequency at which the shaft 20 is rotating, to ensure that background vibrations to not disrupt operation of the imbalance compensator 10.

The vibration chart 722 also has a horizontal axis 740 representing time and a vertical axis 742 representing sensor output. In the configuration of FIG. 9, in which the vibration sensor 48 takes the form of a piezoelectric accelerometer, the sensor output is directly proportional to acceleration of the motor 18, shaft 20, and attached parts in the lateral direction 14, i.e., left or right in the view of FIG. 9. The vibration signal 744 is therefore the acceleration, as derived from the output of the vibration sensor 48, over time.

The vibration signal 744 will have left maxima 750 when the load imbalance 30 is oriented toward the vibration sensor 48, or directly left of the axis of rotation 28. This is the configuration depicted in FIG. 9; the shaft 20 is rotated such that the load imbalance 30 is directly left of the axis of rotation 28. The leftward maxima 750 may be correlated to leftward positions 752 of the phase signal 734. Thus, at the point in time when the vibration signal 744 has a left maximum 750, The small coil 74 is positioned at the leftward position 752, representing the point at which the load imbalance 30 is at its leftmost position.

Similarly, when the load imbalance 30 is furthest from the vibration sensor 48, i.e., directly to the right of the axis of rotation 28, the vibration signal 744 will have right maxima 754. The right maxima 754 maybe correlated to rightward positions 756 of the phase signal 734. In fact, the orientation of the load imbalance 30 at any point in time maybe discovered by comparing the vibration signal 744 with the phase signal 734. The maxima 750, 754 are handy reference points, but a measurement of the slope of any part of the vibration signal 744 can provide a consistent reference point for the load imbalance 30. Such calculations may be carried out by a control system consisting of the processor 70, the control console 44, a separate signal processing unit (not shown), or some combination thereof.

Once the leftward position 752, for example, has been determined, the displacement between the leftward position 752 and the commencement of the receiving zone 736 maybe measured to provide a leading displacement 762. The leading displacement directly corresponds to the leading angle 712 depicted in FIG. 9. Similarly, the displacement between the end of the receiving zone 736 and the leftward position 752 can be measured to provide a trailing displacement 764 that corresponds to the trailing angle 714 of FIG. 9.

The "phase angle" of the shaft 20 is the rotational orientation of the load imbalance 30 about the axis of rotation 28. The phase angle may be taken with respect to some stationary reference. For example, the phase angle may be the angle between the ring controller 42 and the load imbalance 30. As shown in FIG. 9, the phase angle would then be the trailing angle 714, plus the angle between the dashed line running from the axis of rotation 28 to the small coil 74 and the imbalance vector 107. The phase angle may also be taken with respect to any other arbitrarily chosen reference, such as a vector pointing directly upward from the axis of rotation 28. In any case, the phase angle is obtained through the correlation of the phase signal 734 with the vibration signal 744, as described above.

With reference to the balancing ring 40 of FIG. 2, once the leading angle 712 has been determined, the direction of the imbalance vector 107 is known. Thus, the processor 70 can determine which actuators 90 must be energized or de-energized, and to what degree, to move the balancing ring 40 to obtain the new center of gravity 109 to balance the load imbalance 30.

The other imbalance compensators 110, 210, 310, 410, 510, 610 described herein may be controlled in similar fashion. In the alternative, any of the imbalance compensators 10, 110, 210, 310, 410, 510 610 of the present invention maybe controlled through trial and error.

For example, with reference again to FIG. 2, the processor 70 may be configured to choose a random direction in which to move the compensating ring 97. The change in the vibration signal 744 may then be monitored to determine whether the amplitude of the vibration signal 744 has increased or decreased. An increase in the amplitude of the vibration signal 744 indicates that the movement was at least 90° away from the direction 108, while a decrease in the amplitude indicates that the movement was less than 90° away from the direction 108. Successive test movements in different directions may be utilized to more accurately determine the direction 108, so that compensation substantially in the direction 108 can occur.

The trial and error method may be utilized to simplify the hardware and/or software required for operation of any of the imbalance compensators 10, 110, 210, 310, 410, 510, 610. With the trial and error method, the small coil 74 may even be omitted from certain embodiments. However, control through comparison of the phase signal 734 and the vibration signal 744 may permit more rapid and accurate balancing.

Through the system and method of the present invention, load imbalances on rotating members may be effectively compensated for. More specifically, comparatively large imbalances may be counteracted with an imbalance compensator that fits within a comparatively small space around the rotating shaft 20. Such an imbalance compensator may be installed without adding excessively to the weight or rotational inertia of the rotating assembly. Fine tuning may also be achieved through the use of systems that permit minor, as well as major, adjustments to be made. Furthermore, in certain embodiments, imbalance compensators may be manufactured and used with a minimum of complexity and expense.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An imbalance compensator configured to be coupled to a shaft having an axis of rotation with a load imbalance displaced from the axis of rotation in an imbalance direction, wherein the imbalance compensator is configured to provide compensation for the load imbalance in a direction substantially opposite the imbalance direction, the imbalance compensator comprising:
   a housing having a geometric center and an interior opening sized to receive the shaft;
   a solid compensation mass with a variable linear displacement from the axis of rotation, the solid compensation mass having an opening to receive and encircle the shaft;
   a plurality of actuators affixed to the housing, each of which selectively provides force tending to vary the linear displacement of the solid compensation mass with respect to the axis of rotation; and
   a control system operatively connected to the actuators to initiate motion of the compensation mass in a compensation direction substantially opposite the imbalance direction.

2. The imbalance compensator of claim 1, wherein each of the actuators comprises a linear expansion/contraction device configured to receive an electric input signal and produce a linear output force corresponding to the electric input signal.

3. The imbalance compensator of claim 2, wherein the linear expansion/contraction device is selected from the group consisting of piezoelectric actuators, solenoids, hydraulic pistons, pneumatic pistons, and thermal expansion actuators.

4. The imbalance compensator of claim 3, wherein the linear expansion/contraction device comprises a piezoelectric actuator having a movable core positioned to extend to push the solid compensation mass away from the piezoelectric actuator.

5. The imbalance compensator of claim 1, wherein each of the actuators comprises a rotary actuator configured to receive an electric input signal and produce an output torque corresponding to the electric input signal.

6. The imbalance compensator of claim 5, wherein the rotary actuator is selected from the group consisting of rotary electric motors, rotary solenoids, and fluid-driven rotators.

7. The imbalance compensator of claim 1, further comprising a plurality of mechanical transfer devices, each of which is configured to transmit the force from one of the actuators to the solid compensation mass.

8. The imbalance compensator of claim 7, wherein each of the mechanical transfer device is selected from the group consisting of linkages, cams, geared transmissions, hydraulic pistons, pneumatic pistons, worm and spur gear assemblies, and rack and pinion gear assemblies.

9. The imbalance compensator of claim 8, wherein the mechanical transfer device comprises a lever arm configured to receive an input displacement from the actuator, and to exert an output displacement against the solid compensation mass, wherein the output displacement is larger than the input displacement.

10. The imbalance compensator of claim 1, wherein the solid compensation mass comprises a compensation ring encircling the shaft.

11. The imbalance compensator of claim 10, wherein the plurality of actuators comprises at least three actuators symmetrically arrayed around the geometric center, wherein each of the actuators is configured to exert the force inward against the compensation ring.

12. The imbalance compensator of claim 1, wherein the solid compensation mass comprises a plurality of weights, each of which is connected to one of the plurality of actuators such that the weights can be independently actuated with respect to the axis of rotation.

13. The imbalance compensator of claim 1, wherein the control system comprises:
   a vibration sensor configured to provide a vibration signal corresponding to vibration of the shaft;
   a phase sensor configured to provide a phase signal corresponding to rotation of the shaft; and
   sensing circuitry coupled to the vibration sensor and the phase sensor to receive the vibration signal and the phase signal, wherein the sensing circuitry is configured to compare timing of the vibration signal with timing of the phase signal to determine a phase angle of the shaft to obtain the imbalance direction.

14. The imbalance compensator of claim 13, further comprising:
   a stationary sending coil;
   a receiving coil coupled to the shaft; and
   wherein the sending coil is configured to transmit a magnetic transmission to the receiving coil, the magnetic transmission containing a power signal and a control signal embedded within the power signal.

15. The imbalance compensator of claim 13, wherein the sensing circuitry comprises a processor coupled to the housing, wherein the processor is configured to process the vibration signal and the phase signal to initiate motion of a counterbalancing load in a direction substantially opposite the imbalance direction with respect to the axis of rotation.

16. A method for providing compensation for a load imbalance on a shaft having an axis of rotation with a load imbalance displaced from the axis of rotation in an imbalance direction, the method operating to provide compensation for the load imbalance in a direction substantially opposite the imbalance direction, the method comprising:
   providing a housing having a geometric center and an interior opening sized to receive the shaft;
   providing a solid compensation mass with a variable linear displacement from the axis of rotation, the solid compensation mass having an opening to receive and encircle the shaft;
   providing a plurality of actuators, each of which provides force tending to vary the linear displacement of the solid compensation mass with respect to the axis of rotation;
   affixing the actuators to the housing;
   positioning the solid compensation mass to receive the force of the actuators;
   coupling the housing to the shaft such that the shaft extends into the interior opening; and
   activating the actuators to move the compensation mass in a compensation direction substantially opposite the imbalance direction.

17. The method of claim 16, wherein each of the actuators comprises a linear expansion/contraction device configured to receive an electric input signal and produce a linear output force corresponding to the electric input signal.

18. The method of claim 17, wherein the linear expansion/contraction device is selected from the group consisting of piezoelectric actuators, solenoids, hydraulic pistons, pneumatic pistons, and thermal expansion actuators.

19. The method of claim 18, wherein the linear expansion/contraction device comprises a piezoelectric actuator having a movable core positioned to extend to push the solid compensation mass away from the piezoelectric actuator.

20. The method of claim 16, wherein each of the actuators comprises a rotary actuator configured to receive an electric input signal and produce an output torque corresponding to the electric input signal.

21. The method of claim 20, wherein the rotary actuator is selected from the group consisting of rotary electric motors, rotary solenoids, and fluid-driven rotators.

22. The method of claim 16, further comprising:
   providing a plurality of mechanical transfer devices; and
   connecting each of the mechanical transfer devices to an actuator to transmit the force from the actuator to the solid compensation mass.

23. The method of claim 22, wherein each of the mechanical transfer devices is selected from the group consisting of linkages, cams, geared transmissions, hydraulic pistons, pneumatic pistons, worm and spur gear assemblies, and rack and pinion gear assemblies.

24. The method of claim 23, wherein each of the mechanical transfer devices comprises a lever arm configured to receive an input displacement from the actuator, and to exert an output displacement against the solid compensation mass, wherein the output displacement is larger than the input displacement.

25. The method of claim 16, wherein the solid compensation mass comprises a compensation ring configured to encircle the shaft.

26. The method of claim 25, wherein the plurality of actuators comprises at least three actuators symmetrically arrayed around the geometric center, wherein each of the actuators is configured to exert the force inward against the compensation ring.

27. The method of claim 16, wherein the solid compensation mass comprises a plurality of weights, each of which is connectable to one of the plurality of actuators such that the weights can be independently actuated with respect to the axis of rotation.

28. The method of claim 16, further comprising providing a control system, wherein providing the control system comprises:
   providing a vibration sensor, a phase sensor, and sensing circuitry;
   configuring the vibration sensor to provide a vibration signal corresponding to vibration of the shaft;
   configuring the phase sensor to provide a phase signal corresponding to rotation of the shaft;
   coupling the sensing circuitry to the vibration sensor and the phase sensor; and
   comparing timing of the vibration signal with timing of the phase signal in the sensing circuitry to determine a phase angle of the shaft to obtain the imbalance direction.

29. The method of claim 28, wherein providing the control system further comprises:
   providing a stationary sending coil and a receiving coil;
   coupling the receiving coil to the shaft; and
   positioning the sending coil proximate the receiving coil to transmit a magnetic transmission to the receiving coil, the magnetic transmission containing a power signal and a control signal embedded within the power signal.

30. The method of claim 28, wherein providing the sensing circuitry comprises:
   providing a processor configured to process the vibration signal and the phase signal to initiate motion of a counterbalancing load in a direction substantially opposite the imbalance direction with respect to the axis of rotation; and
   coupling the processor to the housing.

* * * * *